US 7,689,498 B2

(12) United States Patent
Rodgers et al.

(10) Patent No.: US 7,689,498 B2
(45) Date of Patent: Mar. 30, 2010

(54) SYSTEM AND METHOD FOR TRADING OPTIONS

(75) Inventors: Kevin Rodgers, London (GB); Jeffrey Dirk Ward, London (GB)

(73) Assignee: Volbroker Limited, London (GB)

( * ) Notice: Subject to any disclaimer, the term of this patent is extended or adjusted under 35 U.S.C. 154(b) by 612 days.

(21) Appl. No.: 10/926,184

(22) Filed: Aug. 25, 2004

(65) Prior Publication Data

US 2005/0044027 A1 Feb. 24, 2005

Related U.S. Application Data

(63) Continuation of application No. 09/707,782, filed on Nov. 7, 2000, now abandoned.

(51) Int. Cl.
*G06Q 40/00* (2006.01)
(52) U.S. Cl. .......................................... 705/37; 705/35
(58) Field of Classification Search .................. 705/35, 705/37
See application file for complete search history.

(56) References Cited

U.S. PATENT DOCUMENTS

| | | | |
|---|---|---|---|
| 4,674,044 A | 6/1987 | Kalmus et al. | |
| 4,677,552 A | 6/1987 | Sibley, Jr. | |
| 4,799,156 A | 1/1989 | Shavit et al. | |
| 4,823,265 A | 4/1989 | Nelson | |
| 4,903,201 A * | 2/1990 | Wagner .................. | 705/37 |
| 4,980,826 A | 12/1990 | Wagner | |
| 5,077,665 A | 12/1991 | Silverman et al. | |
| 5,136,501 A | 8/1992 | Silverman et al. | |
| 5,258,908 A | 11/1993 | Hartheimer et al. | |
| 5,297,031 A | 3/1994 | Gutterman et al. | |
| 5,305,200 A | 4/1994 | Hartheimer et al. | |
| 5,375,055 A | 12/1994 | Togher et al. | |
| 5,500,793 A | 3/1996 | Deming, Jr. et al. | |
| 5,508,913 A | 4/1996 | Yamamoto | |
| 5,557,517 A | 9/1996 | Daughtery, III | |
| 5,615,269 A | 3/1997 | Micali | |
| 5,655,088 A | 8/1997 | Midorikawa et al. | |
| 5,689,652 A | 11/1997 | Lupien et al. | |
| 5,715,402 A | 2/1998 | Popolo | |
| 5,727,165 A | 3/1998 | Ordish | |
| 5,787,402 A | 7/1998 | Potter et al. | |

(Continued)

FOREIGN PATENT DOCUMENTS

EP        0411748        2/1991

(Continued)

*Primary Examiner*—Narayanswamy Subramanian
(74) *Attorney, Agent, or Firm*—Walter G. Hanchuk; Chadbourne & Parke LLP

(57) ABSTRACT

A system and method of trading option contracts, such as foreign currency option contracts, is described. In one embodiment, a system and method for web-based or network-based interactive trading of currency options is described. Users of the system provide volatility runs of currency options, deal on existing offers to sell or bids to buy, or may improve on existing offers to sell or bids to buy. The system and method provide automatic price quotations for a requested option contract by polling internal volatility surfaces of users for prices on the requested contract, and. ensure a more orderly pattern of trades by categorizing the users into discrete tiers which determine a user's obligations to provide offers and bids to the system and which determine a user's opportunities and rights to trade on the system.

26 Claims, 20 Drawing Sheets

U.S. PATENT DOCUMENTS

| | | | |
|---|---|---|---|
| 5,794,207 A | 8/1998 | Walker et al. | |
| 5,797,127 A | 8/1998 | Walker et al. | |
| 5,806,050 A | 9/1998 | Shinn | |
| 5,832,462 A | 11/1998 | Midorikawa et al. | |
| 5,873,071 A | 2/1999 | Ferstenberg et al. | |
| 5,905,974 A | 5/1999 | Fraser et al. | |
| 5,924,082 A | 7/1999 | Silverman et al. | |
| 5,924,083 A | 7/1999 | Silverman et al. | |
| 5,926,801 A | 7/1999 | Matsubara et al. | |
| 5,950,176 A | 9/1999 | Keiser et al. | |
| 5,963,923 A * | 10/1999 | Garber | 705/37 |
| 5,970,479 A | 10/1999 | Sheperd | |
| 5,987,419 A | 11/1999 | Hachino et al. | |
| 6,014,627 A | 1/2000 | Togher et al. | |
| 6,014,643 A | 1/2000 | Minton | |
| 6,016,483 A | 1/2000 | Rickard et al. | |
| 6,112,189 A | 8/2000 | Rickard et al. | |
| 6,263,321 B1 * | 7/2001 | Daughtery, III | 705/36 R |
| 6,278,981 B1 | 8/2001 | Dembo et al. | |
| 6,278,982 B1 | 8/2001 | Korhammer et al. | |
| 6,292,787 B1 | 9/2001 | Scott et al. | |
| 6,317,727 B1 | 11/2001 | May | |
| 6,321,212 B1 | 11/2001 | Lange | |
| 6,343,278 B1 * | 1/2002 | Jain et al. | 705/36 R |
| 6,390,472 B1 | 5/2002 | Vinarsky | |
| 6,536,935 B2 * | 3/2003 | Parunak et al. | 700/99 |
| 6,850,907 B2 * | 2/2005 | Lutnick et al. | 705/37 |
| 7,171,386 B1 * | 1/2007 | Raykhman | 705/37 |
| 7,194,481 B1 * | 3/2007 | Van Roon | 707/104.1 |
| 2001/0049651 A1 * | 12/2001 | Selleck | 705/37 |
| 2002/0169703 A1 * | 11/2002 | Lutnick et al. | 705/37 |
| 2002/0188555 A1 * | 12/2002 | Lawrence | 705/37 |
| 2004/0236664 A1 * | 11/2004 | Sellberg et al. | 705/37 |
| 2005/0283422 A1 * | 12/2005 | Myr | 705/37 |
| 2006/0010066 A1 * | 1/2006 | Rosenthal et al. | 705/37 |
| 2006/0085320 A1 * | 4/2006 | Owens et al. | 705/37 |
| 2006/0271467 A1 * | 11/2006 | Wasendorf, Sr. | 705/37 |
| 2007/0027788 A1 * | 2/2007 | Bandman et al. | 705/36 R |
| 2007/0168275 A1 * | 7/2007 | Busby et al. | 705/37 |
| 2007/0282734 A1 * | 12/2007 | Huntley et al. | 705/37 |
| 2008/0082439 A1 * | 4/2008 | Everaert et al. | 705/37 |
| 2008/0228618 A1 * | 9/2008 | Noviello | 705/37 |
| 2008/0288329 A1 * | 11/2008 | Nannis et al. | 705/10 |
| 2008/0301034 A1 * | 12/2008 | Reding et al. | 705/37 |
| 2009/0089223 A1 * | 4/2009 | Dawson | 705/36 R |
| 2009/0171833 A1 * | 7/2009 | Bandman et al. | 705/37 |
| 2009/0192930 A1 * | 7/2009 | Breitenbach | 705/37 |

FOREIGN PATENT DOCUMENTS

| | | |
|---|---|---|
| EP | 0434224 | 6/1991 |
| EP | 0952536 | 10/1999 |
| WO | 9010910 | 9/1990 |
| WO | 9011571 | 10/1990 |
| WO | 96/18160 | 6/1991 |
| WO | 94/10637 | 5/1994 |
| WO | 97/03408 | 1/1997 |
| WO | 9708640 | 3/1997 |
| WO | 97/22072 | 7/1997 |
| WO | 9858333 | 12/1998 |
| WO | 9910815 | 3/1999 |
| WO | 9914695 | 3/1999 |
| WO | 9919821 | 4/1999 |
| WO | 0003342 | 1/2000 |

\* cited by examiner

| Straddle | | USD | |
|---|---|---|---|
| EUR | | Thu 27 May 1999 | |
| Tue 25 May 1999 | | Wed 30 Aug 2000 | |
| Mon 29 Aug 2000 | | 1.1111 | |
| 0.9000 | | 49.50 | |
| 55.00 | | | |
| 0.90640 | | 1.10327 | |
| 0.90640 | | 1.10327 | |
| 0.00000 | | 0.00000 | |
| 0.00% | | 0.00% | |
| 10.50% | | | |
| 9.460% | | 9.527% | |
| 0.08575 | | 0.10511 | |
| Pay 5,203,143 | | Pay 4,716,129 | |
| 49.6%:49.6% | | 54.7%:45.3% | |
| Buy 0 | | Buy 5,203,143 | |
| 3,666,496 | | 0 | |
| 489,711 | | 443,874 | |

[Hide]

FIG.3

Market Depth  ✕

EURUSD (1 Week)NY

| Side | Price | Size | Date |
|------|-------|------|------|
| Bid | 10.00 | 5 | 14:33:15 25-May |
| Offer | 11.00 | 50+ | 14:33:15 25-May |

EURUSD (1 Week)NY-Trade...

| Side | Price | Size | Date |
|------|-------|------|------|
| B | 10.00 | 50 | 25-May-99 |

Close

FIG.5

EURUSD 3 Months STRADDLE

| | Bid | Ask |
|---|---|---|
| | 11.8 | 13.8 |
| Size | 5 | 5 |

- ○ Deal — 148
- ● Improve — 150

Upper Spot: 0 — 108
Lower Spot: 0 — 110

Timeout: 0 Minutes — 106

Submit — 114
Off — 112

ELECTRONIC BROKER

Price(s) have been turned OFF for:
EURUSD (NY)

| Tenor | Side | Price | Size |
|---|---|---|---|
| 1W | Bid | 10.00 | 10 |
| 1W | Offer | 11.00 | 50 |

| Trade ID | Ccy Pair | Tenor | | | | Buy/Sell | Strategy | | Trade Date |
|---|---|---|---|---|---|---|---|---|---|
| SPE00000005350 | EURUSD | 2W | EUR 8.1 | 10.00% | 33.50% | 0.8145 | B | CALL | 23Aug00 |
| SPE00000005350 | EURUSD | 5M | EUR (5.0) | 10.00% | (10.05%) | 0.8820 | S | CALL | 23Aug00 |
| SPE00000005350 | EURUSD | | EUR (2.25) | | | | S | HEDGE | 23Aug00 |
| SPE00000005351 | EURUSD | 2W | EUR (8.09) | 10.00% | (33.50%) | 0.8145 | S | CALL | 23Aug00 |
| SPE00000005351 | EURUSD | 5M | EUR 5.0 | 11.00% | 10.02% | 1.0005 | B | CALL | 23Aug00 |
| SPE00000005351 | EURUSD | | EUR 2.25 | | | | | HEDGE | 23Aug00 |

Currency Pair: (not filtered)
Counterparty: (not filtered)

☐ Ccy Pair
☐ Tenor
☐ Strategy
☐ Buy/Sell
☐ Counterparty
☐ Trader (not sorted)
then by
(not sorted)
then by
(not sorted)

● Ascending
○ Decending

☐ Details unconf.
☐ Details conf.
☐ not downloaded
☐ downloaded
☐ allfor

Trade Blotter
File  Prices  Trades  Window  Help colorpay
trades confirmed by your counterparties
trades confirmed by both counterparties (not downloaded)

| Trade Blotter | | | | | | | |
|---|---|---|---|---|---|---|---|
| File Prices Trades Window Help | | | | | | | |
| CCY PAIR | AMOUNT (M) | PREMIUM | DELTA | GAMMA | VEGA | COUNTERPARTY | TRADE ID |
| ⊟ EURUSD | EUR(20.0) | ---------- | EUR0.000 | EUR ------ | EUR ------ | CHASE | |
| EURUSD | EUR(10.0) | EUR(990,081) | EUR ------ | EUR ------ | EUR ------ | CHASE | ST000000002053 |
| EURUSD | EUR(10.0) | EUR(627,396) | EUR ------ | EUR ------ | EUR ------ | CHASE | ST000000002053 |
| ⊟ EURUSD | EUR(10.0) | ---------- | ---------- | EUR ------ | EUR ------ | CITI | |
| ⊞ EURUSD | EUR(5.0) | ---------- | EUR0.000 | EUR ------ | EUR ------ | DB | |
| ⊞ EURUSD | EUR(5.0) | ---------- | ---------- | EUR ------ | EUR ------ | NYM | |
| ⊞ EURUSD | EUR(15.0) | ---------- | EUR0.000 | EUR ------ | EUR ------ | SUMITOMO | |

Currency Pair: EURUSD ▷

Counterparty: (not filtered) ▷

☐ Ccy Pair
☐ Tenor
☐ Strategy
☐ Buy/Sell
☑ Counterparty
☐ Trader

FIG.15

Specific Interest

| Ccy | Prem | Maturity | Strategy | Size (m) | Strike | Delta (%) | Vn | Cut | Bid | Ask | | Spot |
|---|---|---|---|---|---|---|---|---|---|---|---|---|
| EURCHF | EUR | 1M | EUR CALL | EUR 10 | 1.508 | 64.0 | | NY | | 11.00 5 | | 1.5 |
| AUDUSD | AUD | 3M | AUD CALL | AUD 10 | 0.6598 | 1.9 | | NY | | | | 0.5 |
| AUDUSD | AUD | 3M | AUD CALL | AUD 10 | 0.0000 | 0.0 | | NY | | CH | | 0.5 |
| AUDUSD | AUD | 3M | AUD CALL | AUD 263594028 | 0.5790 | 0.0 | Y | NY | 12.10 20 | 12.40 20 | 12.00 20 | 0.5 |
| AUDUSD | AUD | 6M | AUD CALL | AUD 30 | 0.6179 | 30.0 | | NY | 12.00 30 | 12.50 40 | | 0.4 |
| NZDUSD | NZD | 4M | NZD CALL | NZD 35 | 0.4608 | 40.0 | | NY | 9.00 | CH | | |
| USDCAD | USD | 1M | USD CALL | USD 40 | 1.4918 | 30.0 | | NY | 9.00 | 9.40 50 | | 1.4 |
| USDCAD | USD | 4M | USD CALL | USD 40 | 1.5027 | 35.0 | | NY | | CH | | |
| USDCHF | USD | 2M | USD CALL | USD 17.62 | 1.7298 | 20.0 | Y | NY | 11.00 40 | 11.50 40 | | 1.6 |
| USDCHF | USD | 6M | USD CALL | USD 10 | 1.7690 | 20.0 | | NY | 10.50 40 | 10.15 40 | | |
| EURSEK | EUR | 1W | EUR CALL | EUR 4224 | 8.5321 | 20.0 | Y | NY | 8.00 | CH | | 8.4 |
| EURSEK | EUR | 4M | EUR CALL | EUR 10 | 8.7254 | 20.0 | | NY | 6.50 40 | 7.00 40 | | |

Post Specific Interest

Leg1

- 182 — Currency: EURUSD — 194
- 188 — Maturity: 1W / New York
- Expiry: 13JUL00
- 190 — Delivery: 17JUL00
- 184 — Strategy: CALL
- 192 — Amount: 5 EUR
- 186 — Strike: 0

- Spot: 0.9575
- Swap: 0.000199
- Deposit: 0.0444 EUR
- Vol: 10.57

- Delta %:

- Comments:

196 — Post    Pricer — 198    Close
200 — Calc

FIG. 17

Trade Blotter

| TRADE ID | CCYPAIR | TENOR | STRATEGY | COUNTERPARTY | DETAILS CONF BY | CP DETAILS CONF | DOWNLOADED |
|---|---|---|---|---|---|---|---|
| SPE00000003560 | USDJPY | 6M | CALL | UBS | Confirm | UBS | NO |
| SPE00000003560 | USDJPY | 6M | CALL | UBS | Confirm | — | NO |
| SPE00000003533 | USDJPY | 6M | CALL | BETA2 | Confirm | BETA2 | NO |
| SPE00000003533 | USDJPY | 6M | CALL | BETA2 | Confirm | — | NO |
| SPE00000003533 | USDJPY | 6M | CALL | BETA2 | Confirm | — | NO |
| SPE00000003500 | EURUSD | 1M | STRADDLE | UBS | BETA1 | UBS | ☐ DOWNLOAD |
| SPE00000003500 | EURUSD | 1M | STRADDLE | UBS | BETA1 | UBS | ☐ DOWNLOAD |
| SPE00000003533 | EURUSD | 1M | STRADDLE | BETA2 | BETA1 | BETA2 | ☐ DOWNLOAD |
| SPE00000003533 | EURUSD | 1M | STRADDLE | BETA2 | BETA1 | BETA2 | ☐ DOWNLOAD |
| SPE00000003502 | USDCAD | 1M | STRADDLE | BETA2 | BETA1 | BETA2 | ☐ DOWNLOAD |
| SPE00000003502 | USDCAD | 1M | STRADDLE | BETA2 | BETA1 | BETA2 | ☐ DOWNLOAD |
| SPE00000003533 | USDCAD | 1M | STRADDLE | BETA2 | BETA1 | BETA2 | ☐ DOWNLOAD |
| SPE00000003533 | USDCAD | 1M | STRADDLE | BETA2 | BETA1 | BETA2 | ☐ DOWNLOAD |
| SPE00000003504 | USDCAD | 1M | STRADDLE | BETA2 | BETA1 | — | NO |
| SPE00000003504 | USDCAD | 1M | STRADDLE | BETA2 | BETA1 | — | NO |
| SPE00000003504 | USDCAD | 1M | STRADDLE | BETA2 | BETA1 | BETA2 | ☐ DOWNLOAD |
| SPE00000003504 | USDCAD | 1M | STRADDLE | BETA2 | BETA1 | BETA2 | ☐ DOWNLOAD |
| SPE00000003510 | EURUSD | 1M | STRADDLE | UBS | BETA1 | — | NO |
| SPE00000003510 | EURUSD | 1M | STRADDLE | UBS | BETA1 | — | NO |
| SPE00000003510 | EURUSD | 1M | CALL | NW | BETA1 | NW | ☐ DOWNLOAD |
| SPE00000003510 | EURUSD | 1M | CALL | NW | BETA1 | NW | ☐ DOWNLOAD |
| SPE00000003512 | EURUSD | 3M | STRADDLE | NW | BETA1 | NW | ☐ DOWNLOAD |
| SPE00000003512 | EURUSD | 3M | STRADDLE | NW | BETA1 | NW | ☐ DOWNLOAD |
| SPE00000003513 | EURUSD | 3M | STRADDLE | UBS | BETA1 | — | NO |
| SPE00000003513 | EURUSD | 3M | STRADDLE | UBS | BETA1 | — | NO |

See Totals for:
- ☐ Currency Pair
- ☐ Strategy
- ☐ Maturity
- ☐ Buy or Sell
- ☐ Counterparty
- ☐ Trader

Sort Trades by:
- (not sorted) ▸
- then by: (not sorted) ▸
- then by: (not sorted) ▸

Which Trades:
- ☐ Details unconf
- ☐ Your Institution

[Display Trades]

FIG. 20

SYSTEM AND METHOD FOR TRADING OPTIONS

This application is a continuation of U.S. patent application Ser. No. 09/707,782, filed Nov. 7, 2000 now abandoned.

FIELD OF THE INVENTION

The invention is directed to a system and method for trading option contracts such as currency options.

BACKGROUND OF THE INVENTION

A buyer of an option contract acquires a right to buy a specific property at a specified price within a specified period of time. There are markets for trading in option contracts for currency, commodities, stocks, bonds and other financial instruments. Options trading presents unique problems, and therefore computerized trading of such options over networks accessed by remote users must be tailored for use in options trading.

Banks that provide currency option products to their clients also deal with each other in order to manage currency risk. Currency options in the interbank market are primarily traded between banks on a one-to-one basis (direct market) or are brokered by a currency options broker (broker market).

In the direct market, banks communicate with each other directly. One bank contacts another requesting a price on an option contract that it wishes to buy or sell in order to manage the risk in its portfolio. The bank that is contacted may "make a market" on the option, meaning that it provides both a bid (a price at which it is willing to buy an option contract) and an offer (a price at which it is willing to sell the same option contract) to the bank seeking the price on the option. The bank seeking the price may choose to buy, sell or do nothing. The benefit of the direct market is that a bank may contact many banks and deal with each of them, thus transferring a lot of risk to a number of different banks. The disadvantage is that the bank will have to cross the bid/offer spread (the difference in price between the offer to sell and the bid to buy the same option contract) and will therefore not necessarily find the best price in the market.

In the broker market, the bank seeking a price on an option (referred to as the "Interest") contacts a broker who in turn makes a market on the option as a result of contacting many other banks. The particular option that the Interest bank wishes to deal is known as the specific-interest. The broker attempts to solicit a price on the specific-interest option from banks called market makers. The broker then assembles the best bid and best offer from the prices obtained from the market makers, and the broker provides this composite price to the Interest. At no stage until a deal is done will anyone except the broker know the identity of either the market maker banks or the Interest. When the Interest sees the price, it may buy or sell or do nothing, or, if it wishes, contribute a better bid or offer to the composite price.

Once the Interest has seen the price and has responded in some way, the broker may then show the price to other banks. These banks may in turn provide better bids and offers inside the price until the bid and offer meet and a deal is made. At this point the broker will identify the counterparties to each other, and, if they are willing to deal with each other from a credit perspective, the remaining economic details of the deal are agreed to and the deal is confirmed. The deal occurs bilaterally between the two banks. The broker is not involved as a principal but acts as an arranger in return for a fee.

One disadvantage of the broker market is that the banks themselves must undertake a final stage of credit checking after a bid and offer are met and after the identity of each party is revealed. The imperfect nature of the credit process can cause problems in a fast-moving market.

All derivatives reference the price of an underlying asset, and in the case of currency options, this asset is foreign exchange spot rate. A disadvantage of the broker market is that market makers are often held to certain option prices when the spot rate of exchange for the underlying currency changes dramatically. Typically, market markers do not like to be held to quoted prices as the spot rate of exchange moves rapidly. This is because the spot price may be "breaking out" of a range, in which case the market perceives options to be cheap and will try to buy them on the market maker's offer, or because the price is drifting back into an old range which can mean that the market is looking to sell. Brokers attempt to protect market makers by not quoting their prices if the spot rate moves dramatically, but this is done on an ad-hoc basis.

Similarly, market makers wish to avoid having stale prices on the market. Brokers try to avoid quoting stale prices, but what is meant by "stale" is generally not clearly defined, and the misunderstandings that arise from this lack of clarity frequently result in prices being withdrawn from the market too soon or too late.

A form of trading that does not go through either the direct or broker markets is so-called "autodealing" or "volatility surface trading." The prices for puts and calls are often quoted in units of volatility, rather than in monetary terms. Volatility is a measure of the change in value of an option contract which may be calculated if the spot rate, strike price, time to expiry and the foreign currency interest rate and domestic currency interest rate are known. The relationship between these parameters is expressed as the Black-Scholes equation, a universally adopted methodology. After an option contract is bought or sold at a specified volatility, the volatility is converted into a monetary purchase price for the option contract using the Black-Scholes equation. A volatility surface is a three-variable relationship wherein a volatility price can be calculated so long as a given time to expire and given strike price are provided.

Large banks typically provide prices on many option contracts each day, both to traditional clients and to smaller banks. To avoid overloading users with hundreds of pricing requests, many large banks have internally implemented volatility surface trading systems, which allow small trades to be priced automatically. The impetus behind the creation of these systems has been to reduce the manual workload for traders, whose time is quite valuable.

The volatility surface trading system must have or be able to calculate the volatility of any option that is requested. The banks therefore provide a "surface" of volatility, defining the volatility, and thus price, of any option that falls within the defined two-dimensional space of time-to-expiry and strike. This surface is updated throughout the trading day. The normal implementation has been to provide the system with a series of volatilities (hence prices) for commonly traded strikes and tenors. The system can then interpolate according to certain rules a "surface" of volatilities for each desired strike and tenor.

A bank customer who requests an option contract at a particular time-to-expiry and a particular strike price is given an automatic price quote for the transaction in terms of volatility, which is convertible into a monetary price. The rules tend to vary from bank to bank but are broadly similar in general terms. Once the "surface" has been created, it is a relatively simple matter to provide a volatility for any option simply by looking up the correct strike and tenor. Users of the system have the advantages of quick pricing of small specific interests. However, the interpolation of volatility surfaces tend to vary from bank to bank because each bank has a separate set of rules for adopting a surface.

Although banks' interpolation rules are broadly similar, they are different enough to cause economically significant differences in volatilities from different banks for a particular interpolated option. This can lead to arbitrage, wherein market participants take advantage of small price differences in equivalent option contracts, to the detriment of the banks making the market.

Accordingly, an accessible electronic trading system that provides counterparties a means for assuring credit before a deal takes place while maintaining anonymity is desirable. Such a system would also provide market makers with the means, for every price and every currency pair: to define the exact spot price that should result in either a bid or an offer becoming invalid, to automatically withdraw invalid prices, to define a time cut-off for each price, and to automatically withdraw prices at the defined time cut-off. It is also desirable to provide a system that limits arbitrage on volatility surface trading.

The design and implementation of any automatic or computerized trading system is difficult. Designing a system which accounts for the creditworthiness of the buyer and seller users of the system and separately maintains current prices for options is especially difficult since there is a complex relationship between credit worthiness and the acceptable option contract price. Existing electronic or computerized trading systems which are not primarily designed for trading options contain inherent inefficiencies in either or both of these systems components and in the time, cost, resources and price transparency.

U.S. Pat. No. 6,014,627 to Togher et al. describes a computerized trading system dealing with financial instruments such as foreign currency by selectively distributing anonymous price quotes in accordance with pre-established credit limits. The system reviews credit information provided by counterparties using the system and automatically determines whether a predetermined level of credit is currently available from a potential party to a transaction prior to submitting a price quotation to the other potential party based on the information provided. By prescreening bids and offers input by parties, each party is only provided with "dealable" prices from counterparties for which credit compatibility exists. The system is directed to trading foreign currency and not currency options and thus does not provide the more complex system requirements for trading option instruments.

U.S. Pat. No. 5,924,082 to Silverman et al. describes a negotiated matching system that uses a "matching computer" to identify a bid and an offer from suitable counterparties based on transaction data and ranking data supplied by each of the parties. Matched counterparties are then provided a communication link to further negotiate the terms of the transactions.

U.S. Pat. No. 5,787,402 to Potter et al. describes a system for trading currencies in which a user inputs the characteristics of the transaction it desires and the system automatically generates an offer in response to the user's request. The user has a specified amount of time to accept the offer, after which the offer is updated.

U.S. Pat. No. 5,905,974 to Fraser et al. describes a system for automated trading in which bids and offers are displayed on customers' terminal screens. A customer may hit a bid or lift an offer, which initiates transactions at a set price point. The system uses five different trading states in which customers with active bids or offers are given priority to make trades. The system is designed to reward current customers providing active bids and offers.

U.S. Pat. No. 5,832,462 to Midorikawa et al. describes an electronic dealing system that manages credit lines between customers and updates the credit lines as transactions occur between the customers. It also describes grouping a set of customers into a home group for setting a common credit line between the group and another customer.

The trading of options in financial instruments presents varying unique complexities which have not been adequately addressed by the prior art systems such as those discussed above. In addition, the advent of the Internet and related web-based and thin-client-based technologies now provides a platform for the development of a network-based currency option trading system and method, which the present invention addresses.

SUMMARY OF THE INVENTION

The invention provides an interactive electronic trading system for options in financial instruments which enables users to trade options under controlled credit risk parameters and with mechanisms implemented which will maintain current pricing for option contract bids and offers. In one embodiment, the invention is directed to a system for dedicated network-based and web-based interactive trading of currency options. Users of the system may provide volatility runs of currency options, may deal on existing offers to sell or bids to buy, or may improve on existing offers to sell or bids to buy. The system of the invention may be set up so that trading is done in units of volatility for the option contract price, and after a transaction is completed, the system converts the volatility price into a monetary currency based contract price. Users of the system of the invention may include, but are not limited to, banks of all sizes and traders or dealers employed by banks or other financial institutions. Users of the system access the system through a workstation. Workstations include desktop, laptop, notebook and handheld computers, web consoles, thin clients, mobile telephones, pagers, personal digital assistants and any other means that allow users to enter or view displays of offer and bid information on option contracts. The system includes a system server, which may include one or more computers for managing network resources, managing network traffic and operating protocol. The system includes one or more communication links that receive and transmit communications between the users of the system and the system server, including communications to users that are parties to a completed currency option contract providing information concerning the completed contract. The communication between users and the system server may occur through high bandwidth lines, such as ISDN lines, telephone lines, or wireless communications enabled by packet radio, spread spectrum, cellular technology, satellites and microwave towers.

The invention is also directed to a system for automatic price quotations for a requested option contract. The system includes users each having an internal volatility surface, and a protocol for polling the internal volatility surfaces for prices on the requested option contract. The lowest price is provided to the user requesting the option contract.

The invention also provides a method for providing automatic price quotations for a requested option contract. When a request for an option contract is received, the internal volatility surface of one or more users is polled to obtain prices for the requested option contract. The prices obtained from the poll are compared, and the lowest price is provided to the user requesting the option contract.

The inventive system for the automated trading of option contracts ensures trades are completed between creditworthy customers by categorizing the users into discrete tiers. For example, users who are assigned to a first tier can perform nearly all of the transactions or functions available on the system. First tier users can make volatility runs, can improve offers to sell and bids to buy options or may deal on offers to sell and bids to buy options. Users in the second tier who deal in smaller volumes of option contracts than first tier users are more restricted in their use of the system. For example, they may only be permitted to improve offers to sell or bids to buy options or to deal on offers to sell or bids to buy options. Alternatively, there can be additional user tiers such as a third tier of users who are restricted only to dealing on offers to sell or bids to buy options.

The system of the invention may further include a system for automatically withdrawing quotes for offers to sell or bids to buy options contracts after an expiration of a certain period of time defined by the user providing the quotes. The withdrawal of quotes is based on a protocol corresponding to a period of time defined by the user offering the option contract. The system for automatically withdrawing quotes may also permit automatic withdrawal of quotes upon a prescribed movement in the market value of the financial instrument underlying the option contract. The system includes a target value for automatic withdrawal of the financial instrument defined by the user and a protocol for comparing the defined value to the current market price. The system further includes a protocol for withdrawing the user's quotes if the user's defined value for the financial instrument equals the current market price for the financial instrument.

Arbitrage avoidance is implemented by a method which includes the steps of receiving a notification that a user's internal volatility surface has changed, polling the user's internal volatility surface for prices of indicative option contracts having prices stored by the system, comparing the current prices stored by the system and providing a notification if the prices obtained from the internal volatility surface are arbitrageable against current prices stored by the system.

BRIEF DESCRIPTION OF THE FIGURES

FIG. 3 shows a screen that provides detailed pricing and contract information for an option contract selected by the user. Details include option strategy, trade, spot, expiry and delivery dates, relevant dates, prices and the system-calculated "greek" values (gamma, vega, spot delta and vanna) that apply to the contract.

FIG. 4 shows a screen that provides all of the prices in the market for a particular currency pair and tenor.

FIG. 5 shows a screen that displays all of the trades for a particular currency pair and tenor that occurred over the previous week.

FIG. 6 shows a screen used for entering, improving, or turning off bids and offers on specific tenors of on-the-run option contracts.

FIG. 7 shows a screen that confirms certain bids or offers submitted by a user for particular option contracts have been turned off.

FIG. 14 shows a trade blotter screen that displays information about all of the deals of a particular user.

FIG. 15 shows the screen of FIG. 14, displaying totals by counterparty.

FIG. 16 shows the main screen for submitting specific-interests to the system.

FIG. 17 shows a screen for entering details on a request for a specific-interest option contract.

FIG. 20 shows a version of the trade blotter screen available to users who need to download details of confirmed trades.

DETAILED DESCRIPTION OF THE INVENTION

Definitions

Figure 1:
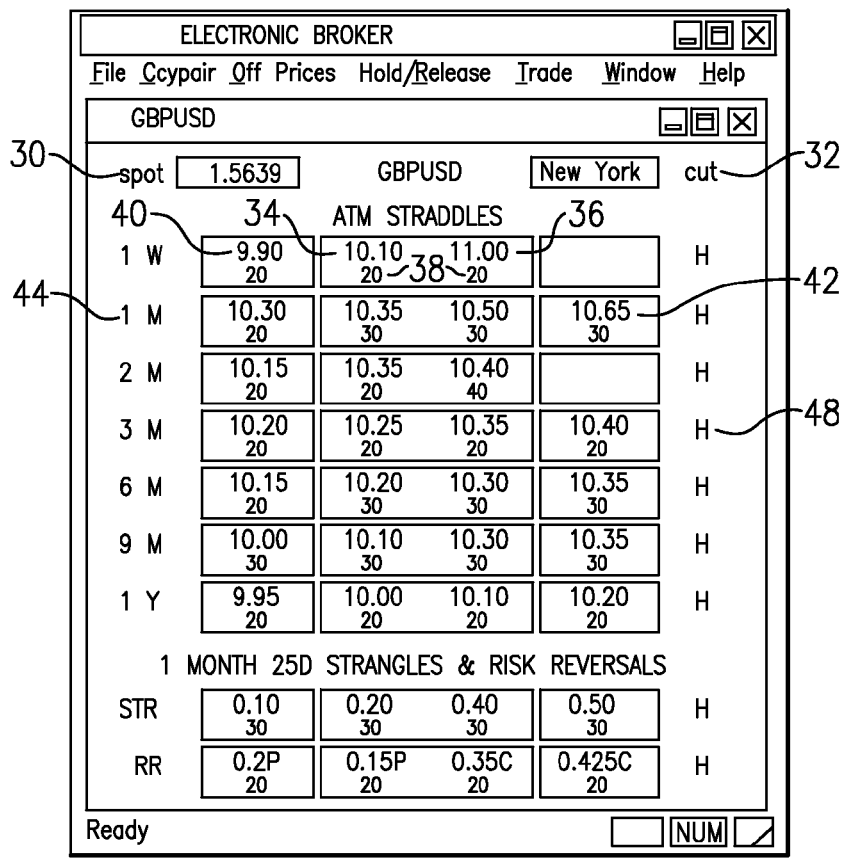
FIG. 1 shows a main screen for dealing on-the-run options, such as At-The-Money Straddle and Risk Reversal options for a given currency pair and provides prices for current live volatility runs.

Call: A call is an option contract to purchase at a certain strike price and tenor.

Currency option contract: A currency option contract grants the right but not the obligation to make a specified exchange of a pair of foreign currency, buying one of the pair and selling the other in specified amounts, at a specified exchange rate (the "strike rate"), which is the rate at which the option contract is exercisable. A currency option contract has a certain period of time before expiration, implying a certain date and time of expiry by market convention; the time to expiry is called the "tenor." As the exercise of the option necessarily entails the purchase of one currency and the simultaneous sale of the other, the currency being purchased by the option-holder is referred to as the "call" currency, the other is referred to as the "put" currency. All currency options contracts specify the call and put currencies and their amounts at their inception. Calls on the underlying currency pair's single-unit currency are referred to simply as "call options" or "calls," while options in which the put currency is the underlying's single-unit currency are referred to as "put options" or "puts" for simplicity.

Delta: Currency options are typically identified by and traded on the basis of their delta rather than their strike price in monetary terms. Delta measures the sensitivity of an option's value to its underlying currency-pair's market price movement. It is the ratio of the absolute change in value of the option as a percentage of the change in market value of the underlying cash rate. Deltas are expressed in percentage value from 0 to 100. Hence, an option whose value changes by half of the market rate has a delta of 50. A call option gains value as the underlying exchange rate appreciates and will lose value as it depreciates. Thus, for a call, delta is near 100 when the market exchange rate for the underlying call currency is well above the option's strike rate (the option is "in-the-money"). Likewise, delta is near zero when the market exchange rate for the call currency is well below the strike rate (the option is "out-of-the-money"). Put options are the reverse. A put option is in-the-money when delta is near zero and the market exchange rate for the put currency is well below the option's strike rate, and a put option is out-of-the-money when delta is near 100 and the market exchange rate for the put currency is well above the option's strike rate.

Delta neutral: Deals are often transacted on a "delta neutral" basis, meaning that the instantaneous spot risk to each bank (the economic risk that derives from the movement in the spot rate, quantified by delta) is hedged by the bank also agreeing to exchange an amount of the underlying currencies that offsets the option's sensitivity to the underlying's spot rate. These "delta hedges" are usually exchanged for "spot" value (by convention usually two banking days after the transaction date), but are frequently exchanged for "forward" (future) value. This exchange of delta hedge is effected at the same underlying exchange rate ("spot rate") upon which the option's value is determined, thus removing the "spot risk" from the options transaction.

Exercise: Some options are limited to exercise on a certain date whereas others may be exercised at any time from inception until expiration. "European exercise" means that the option can only be exercised on the last day of its life. "American exercise" means that the option can be exercised at any time prior to expiration.

On the-run option: An on-the-run option is a straddle (a simultaneous purchase of a put option and a call option on the same currency pair with the same tenor and strike rate), struck at-the-money-forward (ATMF, meaning that the exercise price is same as the current market price of the underlying transaction at the same maturity) for a standard tenor (for example, expiring in one month's time).

Put: A put is an option contract to sell at a certain strike price and tenor.

Run: A dealer's set of prices to buy and sell the commonly traded round-date tenors for on-the-run options in a particular currency pair. Options whose strike rates, tenors, or other features make them "off-the-run" are also traded, but less commonly.

Specific interest options: Specific interests are off-the-run options that have one or more special features. By convention, specific interests are posted into the dealing community on a request for quote ("RFQ") basis by the interested party, at which point dealers will make one- or two-way prices.

Spot rate: The spot rate is the current market rate of the underlying transaction to the option contract. The spot rate for currency options is the quotation for an exchange of currencies occurring typically two bank business days after the date of quotation. For a call, when the strike price is below the spot rate of exchange, the option is said to be "in the money." Similarly, when the strike price is above the spot rate of exchange, the option is said to be "out of the money." For a put, the reverse is true. When the strike price is below the spot rate of exchange, the option is "out of the money." When the strike price is above the spot rate, the put option is "in the money."

Strike price: The strike price is the price at which the purchaser of the option contract can exercise the underlying transaction. In the case of a currency option, the strike price is the exchange rate at which the purchaser of the contract may exercise.

Tenor: An option's tenor is the amount of time until its expiry. In the currency options market there are standard tenors for the majority of contracts traded. These include expiry dates set in the future by one week, one month, two months, three months, six months, nine months and one year. Options with tenors other than these are traded, but they are not considered "on-the-run."

Volatility: The prices for currency options are often quoted in units of volatility, rather than in monetary terms. Volatility in this case is a market determined rate upon which option value is determined. It is the annualized standard deviation for the underlying and bears a direct relationship to the option's value. This volatility figure, along with other contract specifics and market prices render option value (the "premium") via the Black-Scholes options pricing equation, a universally recognized methodology. Because all other value inputs are determined (strike rate, tenor, call and put currencies), or determinable (the spot rate, forward rate, interest rates in each currency), volatility prices for options translate into cash prices that both buyer and seller of the option nearly always agree on. Volatility is a key concept in options trading because it is typically used as a proxy for the premium price by all market participants. After an option contract is bought or sold at a specified volatility, the volatility and agreed inputs ate converted into a monetary purchase price for the option contract using the Black-Scholes equation.

Volatility run: A volatility run is a set of prices expressed in terms of volatility for every standard tenor for a particular currency pair at a particular strike price.

Volatility surface: An option's volatility input will depend on its strike rate and tenor. A volatility surface is a two-dimensional relationship plotted in 3 dimensions and defines a close estimate of market volatility for an option on a currency pair, as specified by strike and tenor. Options dealers often use internally-generated volatility surfaces to price specific interest options and to mark options portfolios to market.

Underlying currency pair: Pairs of currencies trade for cash settlement among professional dealers in the inter-bank market. Each currency pair's exchange rate is quoted in terms of the amount of one currency required to purchase a single unit of the other. Which currency is assigned to be the single unit is determined by market convention. Currency options derive their value in part from the exchange rate level at which the underlying currency pair is trading.

The invention addresses the specific problems inherent in designing a network-based trading system that facilitates the trading of option contracts. This invention provides an automated system capable of handling trades of options in financial instruments, such as currency options, and their unique parameters and considerations. In one embodiment, the invention addresses the trading of currency options by and between banks. Users of the system include, but are not limited to, banks of all sizes and traders or dealers employed by banks or other financial institutions.

The system of the invention supports standard option products with tenors, for example, up to 1 year and can accommodate products with longer tenors as well as non-standard options. The system of the invention allows users to trade both on-the-run options and specific-interests.

The system maintains a current database of volatility prices on option contracts and transmits them to all authorized system users. The system of the invention may poll system users, or poll one or more volatility surfaces maintained by system users, to obtain a list of volatility prices for a requested option contract. In either case, for each option contract, the system shows the best price available along with the amounts of currency for which the best bid or offer applies. It also shows the second-best bid and if desired other less preferential bids and offers available if any. Typically, at no point prior to dealing are the identities of the users disclosed to other users.

Users may obtain from the system a price on any specific-interest. Once the specific-interest is defined by the user, market maker users have the opportunity to make a market on the option. The system may support trading in currency pairs including, but not limited to, the following currencies: EUR (Euro), USD (United States dollar), JPY (Japanese yen), GBP (British pound), CHF (Swiss franc), AUD (Australian dollar), NZD (New Zealand dollar), CAD (Canadian dollar), SEK (Swedish krona), NOK (Norwegian krone) and GRD (Greek drachma).

The invention also provides a way for a user to identify the counterparties with which it prefers to deal in terms of credit. The user of the system sees only the prices of counterparties with which the user may deal in terms of credit. These "credit filters" promote system efficiency by displaying only bids and offers on which the user may deal. Using an online credit input screen, or an automatic file upload, each user defines the counterparties with which it can deal by providing for each counterparty with which it will deal (1) the maximum tenor it can deal to and (2) the maximum size (or maximum value at risk, "VaR") of option it can deal for. The user may update these preferences as many times as it chooses. These preferences are stored in the system's computer database. The system operates a protocol whereby every time a new bid or offer is entered by a system user, the system consults the current user preferences in the database to determine which user screens should display the newly entered bid or offer.

The system of the invention can be managed so that it does not show to a user prices from a counterparty other than one with which the user can deal, nor will it show prices on an option that is of an inappropriate tenor or is too large. Each user sees only prices on which the user knows he can deal according to the data that the user has supplied to the system. If two institutions meet on a price displayed by the system, the deal will be deemed to be binding. At that point, the user cannot turn down a counterparty on grounds of credit. Thus, the system of the invention allows a great deal of flexibility to define credit filters and to see prices that are tradable, but requires in return that users take the burden of responsibility for credit decisions upon themselves.

Alternatively, the user may view the prices of all counterparties, regardless of whether the counterparties meet the user's credit requirements. The system may also be configured so that a user may view the prices of all counterparties, but will be able to discern by an on-screen indicator the prices which meet the user's credit requirements. An example of such an on-screen indicator is a specific color for prices that do not meet the user's credit requirements.

A user may also directly deal with other users. Users can specify another user or set of users to contact for prices on a one-to-one basis. Users may choose a list of other users by name.

Users may also request prices from other users anonymously, based on historical price-making performance ranking. A user may request a price on a given currency pair based on performance of a specified number of top users, based on the users' liquidity performance per currency pair and per tenor over a specified time period. For instance, for USD/JPY, User A may request prices from three users who have provided the best performance for the three month tenor, over the last month. Or, a user may request a price on a given currency pair based on performance of a specified number of top users, based on the percentage of time for which the users have provided the best price, over a specified period time.

The system of the invention also provides a means for automatic withdrawal of stale quotes. The system of the invention allows users to define a time cut-off for each offer or bid (a "time-out"), after which prices are automatically withdrawn. The system allows withdrawal of prices if there is more than a prescribed movement in the value of the underlying currency. The user may define a particular barrier spot rate price for each currency pair called a "spot-out." If the spot price of a currency pair reaches the spot-out defined by the user, the user's bids and offers for that currency pair are automatically withdrawn. These "time-out" and "spot-out" facilities allow market makers to be protected from stale prices and large market moves. The availability of these features should result in greater willingness to make prices and thus, greater liquidity throughout the system.

The system also provides priority rules for bids and offers. The system prioritizes bids and offers according to two criteria: first, by the price level of the bid or offer; second (as to equal prices), by the time the bid or offer was submitted. These rules create greater transparency in the market than is currently available. The priority of bids and offers by price is displayed on the screen in that only the best current price, along with the second best price, is displayed for a particular option contract. The priority among users at the same price is not reflected on-screen except that when a user joins at a particular price level the additional volume will appear on-screen as an increase in the volume. A single volume is displayed for each price which represents the total of the individual volumes at that particular price.

New bids and offers are constantly being submitted, and as time passes and the spot market moves, bids and offers will time-out and spot-out. Accordingly, the price of each option changes continuously. Users see these changes virtually instantaneously, further increasing transparency in the market.

Transparency of the market is further increased by the system of the invention with a screen that indicates the depth of the market, shown in FIG. 4. This screen gives the user the ability to view all pending bids and offers for any given currency pair and tenor as well as the amount available to trade at each price. The depth of market stack may be displayed best to worst bid/offer, with the user's position, if any, appearing in the queue in a different color. Therefore, the depth of market screen allows a user to view, for instance, how many banks are potential dealers on a particular currency option, how much volume is available, and whether any bids or offers are out of line.

The system calculates the actual price from the volatility price of each contract in real-time and displays the actual price upon request. This feature is an improvement over current practice where price from volatility is calculated after the deal is done, and can be disputed if a user does not agree with the inputs that have been used for the calculation. In the system, the spot rate, forward rate and interest rate information that are required for the calculation of price are provided by live feeds from market standard information systems as well as from the users' own internal feeds. Preferably, these feeds may only be amended by mutual consent.

The system may also include a means to resolve disputes between counterparties. The system provides the ability to download the details of a deal once it has been confirmed. At this point, a support person of the system can mediate a dispute between the counterparties. Since all deal details are displayed to the user before it deals, such situations should rarely arise.

After all details of the deal are agreed upon, the deal is posted to the system database. Each user is able to see all the trades it has made and is given the opportunity to download the details locally. This electronic download saves a great deal of manual booking and ticket writing. The system also keeps a record of when users have made markets on specific-interests or have provided volatility runs, in order to assess to what extent these users fulfill any obligations they may have as market makers.

As an adjunct to the broker functions that the system provides, the system may also allow users that are price-takers to deal automatically either on volatility surfaces provided by users that are price-makers on the system or on the prices provided by price-makers when the volatility surfaces maintained by these users are polled by the system.

Access and Security. Each client organization may have several log-ins to the system. Most users will have their own log-ins and customize their screens to suit their particular roles. A separate log-in can be provided to the credit department to allow users to upload the credit file. Each access is password protected.

The heaviest users of the system can be provided with dedicated high bandwidth lines, such as ISDN lines, for direct access to the system, while lighter users may access the system through a standard Internet access or telephone line. The system may also be designed to run on networks other than the Internet, such as dedicated user networks.

The security of the system is assured by basing it on a secure server with a hot backup. For example, 128-bit RSA, public key-based encryption system may be used for all transmissions.

Management Information. The system collects data on deals done and number of markets made. Collection of data on deals done allows reports to be prepared to show each user what market share it has and provides the input to the brokerage billing process. The system of the invention collects data on the number of markets-that each user has made, and the proportion of time that volatility runs have been kept live in order to assess the user's performance relative to its market-making obligations.

Technical Overview. The system transmits prices to, and responses from, users via commercially available software packages. This messaging software runs on its own dedicated server. Locally, information is handled by an operating system such as JAVA® (available from Sun Microsystems) or Windows®-based graphical user interface (available from Microsoft). Contract details may be entered and options details are calculated using a pricing screen, which calculates deal details of currency options.

Tiers of Users. In order to promote liquidity and to cater to the differing needs of different types and sizes of users, each user may be placed or "tiered" in two or more tiers. Each tier has different access capabilities, trading capabilities and fees. In one embodiment of the system of the invention, the users are tiered in one of three tiers.

First Tier. In a currency option trading system, the users in the first tier are the major currency option market makers. These users provide volatility runs and volatility surfaces, make markets on specific-interests, ask for specific-interests, and are able to provide improvements to existing prices. When trading through the system, first tier users pay one rate of brokerage (lower than the current market average) for regular deals. The first tier users pay another, even lower rate, if they deal on an option where they previously have made a market on the system. For example, if, a user made a market on the system in one month EUR/USD straddles as part of its volatility run for that currency, and subsequently hit a bid that was put inside its price, the user would pay the reduced level of brokerage. The pricing system is intended to encourage the provision of prices. If, on the other hand, a first tier user does not fulfill its market making obligations, it faces penalties, such as increased brokerage rates or withdrawal of its market making privileges. First tier users are required to provide volatility runs to ensure adequate market coverage by the system. The provision of volatility surfaces, unlike the provision of volatility runs, is entirely voluntary.

Second Tier. The second tier comprises the bulk of the users classified according to credit rating. They can make volatility runs, improve existing prices and ask for specific-interests, but they cannot make markets on specific-interests. They pay a flat rate of brokerage on all deals. This rate may be significantly lower than current market prices but higher than that for first tier users. They are also permitted to use the autodealing function of the invention, as described above. In addition, they are able to use the autodealing function of the invention for deals under a certain threshold in terms of size in certain liquid currency pairs. For second and third tier users, the system provides an autodealing price on their specific-interest from the lowest bid and highest offer that result from the system's poll of the volatility surfaces maintained by first tier users, or alternatively, from the volatility surfaces created by the system from the volatility surfaces provided by the first tier users.

Third Tier. Third tier users are typically small regional users dealing in small size option contracts. They do not make any markets or improve existing prices. They are, however, able to ask for specific-interests.

An example of the tiering functions and capabilities of a currency trading system is summarized in the following table:

TABLE I

| Tier | Provide Bids/Offers For Volatility Surfaces? | Provide Volatility Runs? | Ask Specifics? | Make Specifics? | Improve Prices? | Autopricing Surface Prices Takers | Brokerage Rate | Penalty For Not Meeting Obligations |
|---|---|---|---|---|---|---|---|---|
| First | Yes | Yes | Yes | Yes | Yes | No | Flat rate | Increased brokerage rate; lose market making privileges |
| Second | No | Yes | Yes | No | Yes | Yes | Flat rate | None |
| Third | No | No | Yes | No | No | Yes | Flat rate | None |

The Two Tier Configuration. The system can be configured to include two tiers of users: price-makers and price-takers. The first tier in the two tier configuration corresponds to the first tier of the three tier configuration, i.e., market makers who provide volatility runs and volatility surfaces and who make specific interests. The second tier in the two tier system is a hybrid of the second tier and the third tier in the three tier system. The second tier user in the two tier configuration can be a price-maker on volatility runs, it can ask for specific interests and be an autopricing surface price taker. The tiered functions and capabilities of a two tier currency trading system is summarized in Table II:

TABLE II

| Tier | Provide Bids/Offers For Volatility Surfaces? | Provide Volatility Runs? | Ask Specifics? | Make Specifics? | Improve Prices? | Autopricing Surface Price Takers | Brokerage Rate | Penalty For Not Meeting Obligations |
|---|---|---|---|---|---|---|---|---|
| First | Yes | Yes | Yes | Yes | Yes | No | Flat rate | Increased brokerage rate; lose market making privileges |
| Second | No | Yes | Yes | No | Yes | Yes | Flat rate | None | and prices to the system of the invention. Prices may be generated dynamically to avoid holding the complete surface in memory.

Using the system, surface price takers can ask for an anonymous surface price. Once a deal is executed in this method, it can still be declined due to credit. To assure they won't be declined due to credit, surface price takers can identify themselves when requesting a surface price. The system of the invention will display the best price given credit availability. Once executed using this method, the deal cannot be declined on credit.

Autodealing on Volatility Surfaces. The system of the invention also provides a means for eliminating arbitrage, which occurs upon trading on internal volatility surfaces, by providing computerized autodealing on composite prices derived from many different internal volatility surfaces.

Autodealing occurs by a poll of first tier users. For each autodealing price needed, the system polls a computer of each first tier user, and each first tier user's computer provides a price for the option sought. The price provided by each first tier user is based upon a price derived internally by the first tier user, presumably by interpolation of a volatility surface created by the first tier user according to the interpolation rules of that user. The system of the invention provides the best and second best prices to the user who requested the price.

Preferably, market-making users maintain a volatility surface that can be used to specify the volatility used for options expiring on every business day in the next year and for every delta from 5% to 95%. Each market-making user has a volatility request mechanism on a web or network server on the user's premises. The system of the invention has an Application Program Interface (API) that resides on the user's web or network server. The API defines the formats for requests from If there is an arbitrage between two prices returned by the first tier users, the bid/offer spread cross, causing a large potential loss to the market maker bank who has unknowingly crossed over the bid/offer spread. The system of the invention eliminates the arbitrage by allowing the user to trade on only one side of the price.

The system of the invention also has a feature to avoid arbitrage with prices held by the system. Each time a first tier user changes its internal volatility surface, the first tier user informs the system of the invention of the change. The system then polls the first tier user's computer for prices of certain indicative options. The indicative options may include, for example, 10% and 25% delta puts and calls and at-the-money forward straddles for all of the on-the-run tenors (1 month, 2 months, etc.). The prices of the indicative options are compared to the highest bid and lowest offer for each of the indicative options currently held by the system. The first tier user that is contributing the prices for the indicative options will be notified by the system if the prices contributed are arbitrageable against the highest bids and lowest offers stored by the system. With this information, the first tier user may alter its volatility surface to correct for the arbitrage. If the arbitrage is not eliminated by the first tier user, the system will eliminate the arbitrage by only allowing users to trade on one side of the price.

Autodealing may also occur using a volatility surface created by the system of the invention. First tier users contribute data for a volatility surface for each currency pair that they have committed to make markets for. The system of the invention accepts these surfaces in a pre-specified format from users and then uses these multiple surfaces to provide a composite price to give to a surface price taker. The "pre-specified format" will be a very fine grid of deltas and tenors, i.e., with a large number of data points (defined option volatilities) making up the surfaces. The reason for requesting a finely defined grid is to avoid the need to perform interpolations from a coarse grid in the system of the invention itself. Users' interpolation rules, though broadly similar, vary sufficiently to cause economically significant differences in volatilities for interpolated options even where the defined option volatilities are identical. The system of the invention greatly reduces the effect of varied interpolation rules because the finer the grid, the smaller the differences are. These surfaces will specify the volatility to be used for options expiring on every business day in the next year and for every delta, in 5% increments, from 5% to 95%. First tier banks also quote a bid/offer spread (in terms of basis points) that the system uses to create two-way prices around these mid-market volatility levels. These users provide the surfaces to the system of the invention in the form of an uploaded file.

The updating of information on users' volatility surfaces allows the system to keep the values consistent with the way currency options are currently trading. Updating occurs in two stages. First, the 50%-delta volatilities on the surface are updated to be consistent with the currently tradable volatility run. Then, the off-the-run volatilities for options whose deltas are not 50% are adjusted to maintain the same relationship with the 50%-deltas as was specified in the original uploaded surface. This updating feature provides an advantage over volatility surface trading systems implemented individually by large users because in the system of the invention stale prices are not quoted from the volatility surfaces as the volatility market moves.

EXAMPLE 1

An example of on-the-run options traded according to the method of the invention is as follows.

Input Screen. FIG. 1 is a screen for dealing on-the-run options. The screen provides the current live volatility runs for the GBP/USD currency pair. This screen could also be configured to show the current live volatility runs of more than one currency pair. Each user's desk may customize which currency pair or pairs that appear on the screen. For each currency pair, prices are shown for all of the standard tenors (for at the money forward (ATMF) straddles as well as for one month 25% delta strangles (a combination of a put and a call in the same currency pair expiring the same day, where the put and call have different strike prices) and risk reversals (the simultaneous sale and purchase of both a call and a put with the same expiration month and with different strike prices or with the same strike prices and different expiration months).

The screen of FIG. 1 shows the prices for GBP/USD contracts. The "spot" 30 is located on the upper left hand corner and indicates the current spot price for the currency pair from which all contract details will be calculated. The user can also see what cut-off convention (either the "New York Cut" with options expiring at 10 a.m. New York time, or the "Tokyo Cut" with options expiring at 3 p.m. Tokyo time) applies to each bid or offer. The cut-off convention abbreviated "cut" 32 is located on the upper right hand corner of the screen. The price of the one-week (indicated by 1W on FIG. 1) contract is shown by the following data. The best bid 34 and the best offer 36 are shown in the center as 10.10 and 11.00, respectively. The 10.10 offer 36 is shown in a particular color, for example red, because this offer has been placed by the user of the system. A user that has not placed this offer would see this number in a different color, for example blue. The amount of currency that the price is good for is shown by the smaller numbers 38 underneath the bid and offer. In the one-week contract, the small number 20 indicates that options on 20 million GBP are being bid and offered. (According to market convention, 20 million GBP in the context of an on-the-run ATMF straddle means 10 million GBP are call options and 10 million GBP are put options.) The smaller numbers on left and the right of the best bid and offer show the second best bid 40 and second best offer 42, if any, and the corresponding amount of currency that can be traded on them. In this embodiment, only those bids and offers provided by counterparties with which the user has specified that it can deal from a credit viewpoint are displayed.

Figure 2:
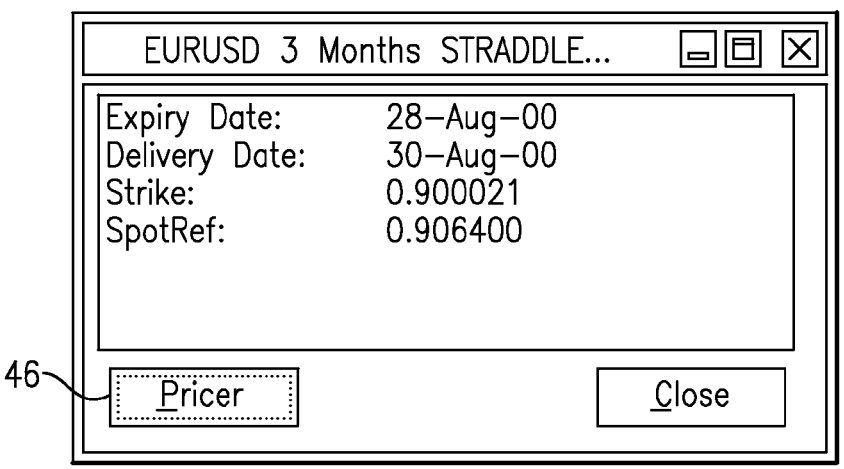
FIG. 2 shows a screen that provides summary data for a particular option contract, including expiry date, delivery date, strike price and spot reference.

From this screen (FIG. 1), a user can access additional useful information. If the user clicks to the left of the contract price, on the tenor period 44 (e.g., 1M), a screen will appear that shows the current details of the trade for that tenor. FIG. 2 shows an example of this screen for a 3M EUR/USD contract. The screen of FIG. 2 provides information on expiry date, delivery date, strike price and spot price. When the user clicks on the "Pricer" button 46 of the screen of FIG. 2, additional information about the option contract, such as price in monetary terms, spot to delta ratio, hedge, gamma vega, and vanna appears in an additional screen, shown in FIG. 3.

When the user clicks on a price in the middle columns of FIG. 1, a screen that provides depth of market appears, shown in FIG. 4. This screen shows all of the prices in the market for that tenor. The depth of market stack is displayed best to worst bid/offer, and the user's position, if any, is indicated by appearing in a different color.

The user may also view the transaction history of a particular tenor from the screen of FIG. 1. The user clicks on the "H" 48 located to the right of the prices for a particular tenor, and a transaction history screen for the tenor appears, as shown in FIG. 5. The transaction history screen shows the trades that have been done for that tenor over the last week.

Improving or Joining Prices. The user can act on the price displayed on the screen of FIG. 1 by double-clicking on the price itself, which allows the user either to improve the price or to deal. If the user chooses to improve the price of, for example, the USD/JPY one-month, the screen will appear as shown in FIG. 6. Versions of the screen of FIG. 6 customized to specific options strategies, such as Straddles and Risk Reversals and are also available in Deal mode (see FIG. 11). This embodiment includes entry/display fields for bid and ask price, face amount, as well as upper, lower and time-out limits for the price.

The user can input its own bid or offer for a particular amount of currency from the screen shown in FIG. 6. In this example, the user is submitting a bid 102 of 10.00 on 30 million USD and an offer 104 (denoted "Ask" in FIG. 6) of 11.00 on 30 million USD. From the screen shown in FIG. 6, the user may improve its own prices as well. In addition to specifying the level and the size of bids and offers, the user may specify a time-out, e.g., how long the price is good for. The user specifies a time-out by entering the time in minutes that the submitted price is good for beneath "Timeout" 106 on the screen of FIG. 6. The user may also specify a spot-out, the value of spot that is the trigger for canceling the bid or offer. The user specifies an upper spot 108 and a lower spot 110 on the screen of FIG. 6. If the spot price moves outside of or equal to these limits, the submitted price will be taken off.

If the user chooses the "Off" button 112, a previously submitted price for that tenor will be removed. When the Off button is selected, the screen of FIG. 7 appears to confirm that a particular price is turned off.

Figure 8:
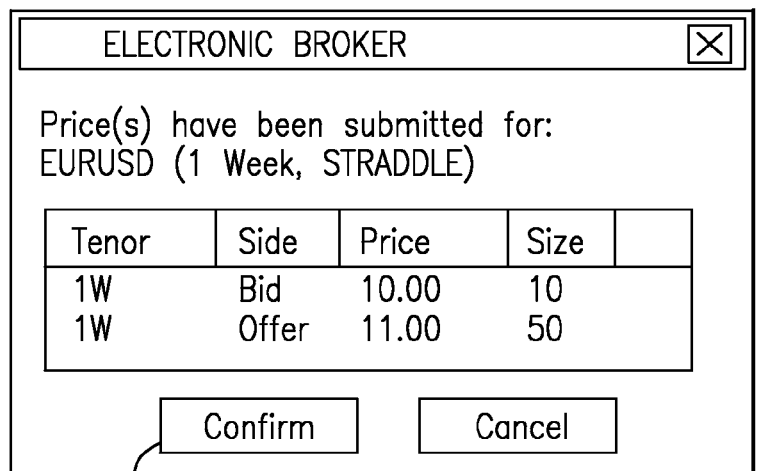
FIG. 8 shows a screen used to view and confirm new prices and corresponding currency face amounts on option contracts submitted to the system.

If the user chooses "Submit" 114 on the screen of FIG. 6, the user must confirm its prices. When the user clicks on the "Submit" button of FIG. 6, the screen of FIG. 8 will appear. The user selects "Confirm" 116 on the screen of FIG. 8 to confirm its prices.

Once the user submits and confirms its bid and/or offer, the system of the invention transmits the new price to all users. If the user has joined the bid, i.e., has submitted a bid that is equal to the current best bid, the system of the invention transmits the same price as before but with an improved size on the bid. If the user has joined the bid and another user trades at this bid, the user's bid will not be filled until the bids that were submitted before its bid are filled according to priority rules.

Users submit entire volatility runs to the system. The system provides a Run Entry Screen for inputting such volatility runs. A trader can enter individual prices into the system for every contract in the run. Alternatively, by using the Run Entry Screen, the trader can default every price to the current best price for that particular option in the system. By clicking on a particular entry, the trader can either join the market default price or change the price to a desired entry other than the default price. The Run Entry Screen also permits a trader to set a default size, a time-out, a lower spot limit and upper spot limit for all entries in a run.

Figure 9:
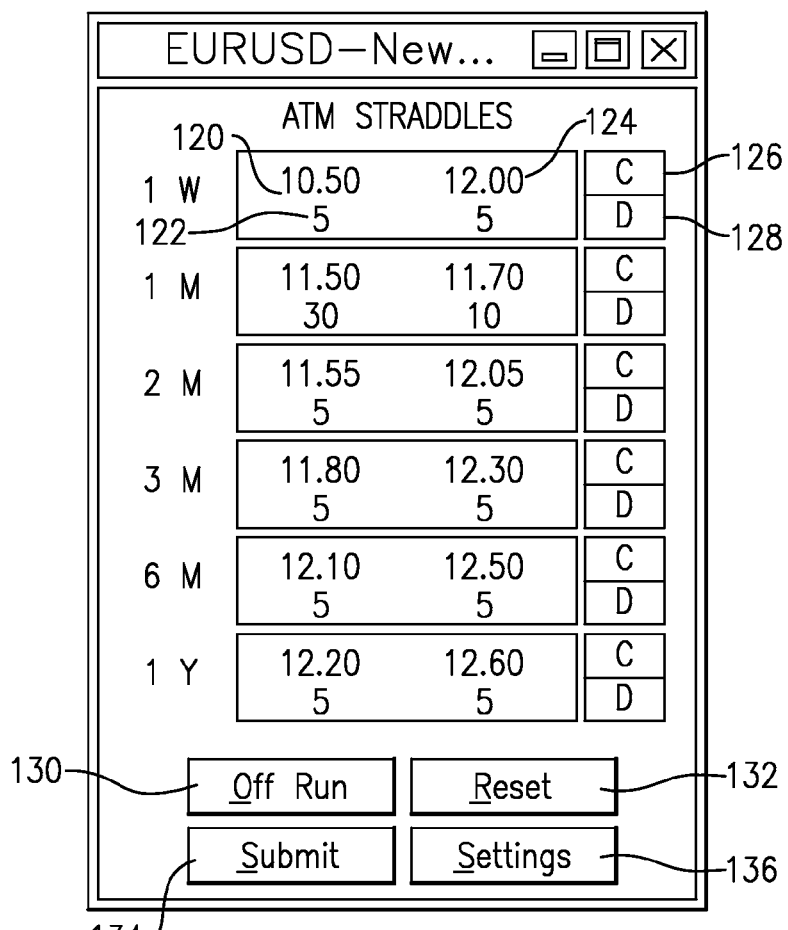
FIG. 9 shows a Run Entry screen, which allows users to enter prices for every standard tenor of an on-the-run option for a selected currency pair.

FIG. 9 shows an example of a Run Entry Screen for a US Dollar/Canadian Dollar currency pair for at-the-money (ATM) straddles for each bid and offer of a tenor, the screen displays a bid 120 on the left with a corresponding size 122 represented by the smaller number below the bid. Similarly, the number to the right is an offer 124 with a corresponding size represented by the smaller number below the offer. To the right of each bid and offer is a button marked "C" 126 and a button marked "D" 128. A trader who clicks on "C" 126 will clear the price and size for that tenor. Clicking on "D" 128 puts the default size for the run. At the bottom of the Run Entry Screen, there are four larger buttons entitled "Off Run" 130, "Reset" 132, "Submit" 134 and "Settings" 136. Selecting the "Off Run" 130 button removes all previously submitted prices for the currency pair. Selecting the "Reset" 132 button clears all displayed prices and sizes in the dialog. Selecting the "Submit" 134 button submits all displayed prices and makes the prices available and visible to other users in the system.

Figure 10:
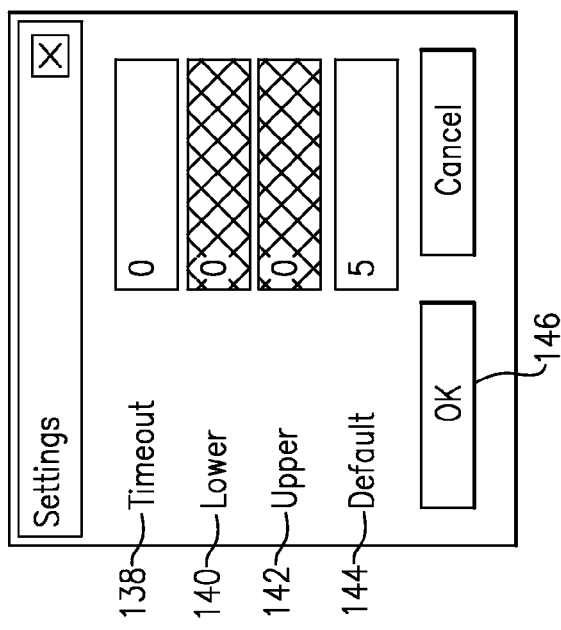
FIG. 10 shows a screen used to enter a time-out, lower spot-out, upper spot-out and default size applicable to validity of prices entered on the Run Entry screen of FIG. 9.

By selecting "Settings" 136, the user accesses another display, an example of which is shown as FIG. 10. In this display, a user can set a time-out 138, a lower spot limit 140 and an upper spot limit 142, as well as a default size 144 for the run. After inputting these settings, the user can save the settings as applying to the volatility run by selecting "OK" 146.

To prevent arbitrage, if the user submits a run that includes a bid or an offer that crosses the bid-offer spread of any contract currently in the system, the system notifies the user. The user is prompted by the system to confirm that it wishes to enter the bid or offer even though it crosses the spread.

If the user joins the bid/offer, (i.e. submits a bid/offer that is equal to a current bid/offer), the system will transmit the same price as before but with a combined, or "stacked," size on the bid/offer. For stacked prices, trades will be done on a first-in-first-out basis, i.e. the full amount of the first price at the level will be executed before any of the second or subsequent stacked prices are executed. These prices are displayed in an agreed color if the user is a part of the stacked price; otherwise they will appear in another agreed color.

Figure 22:
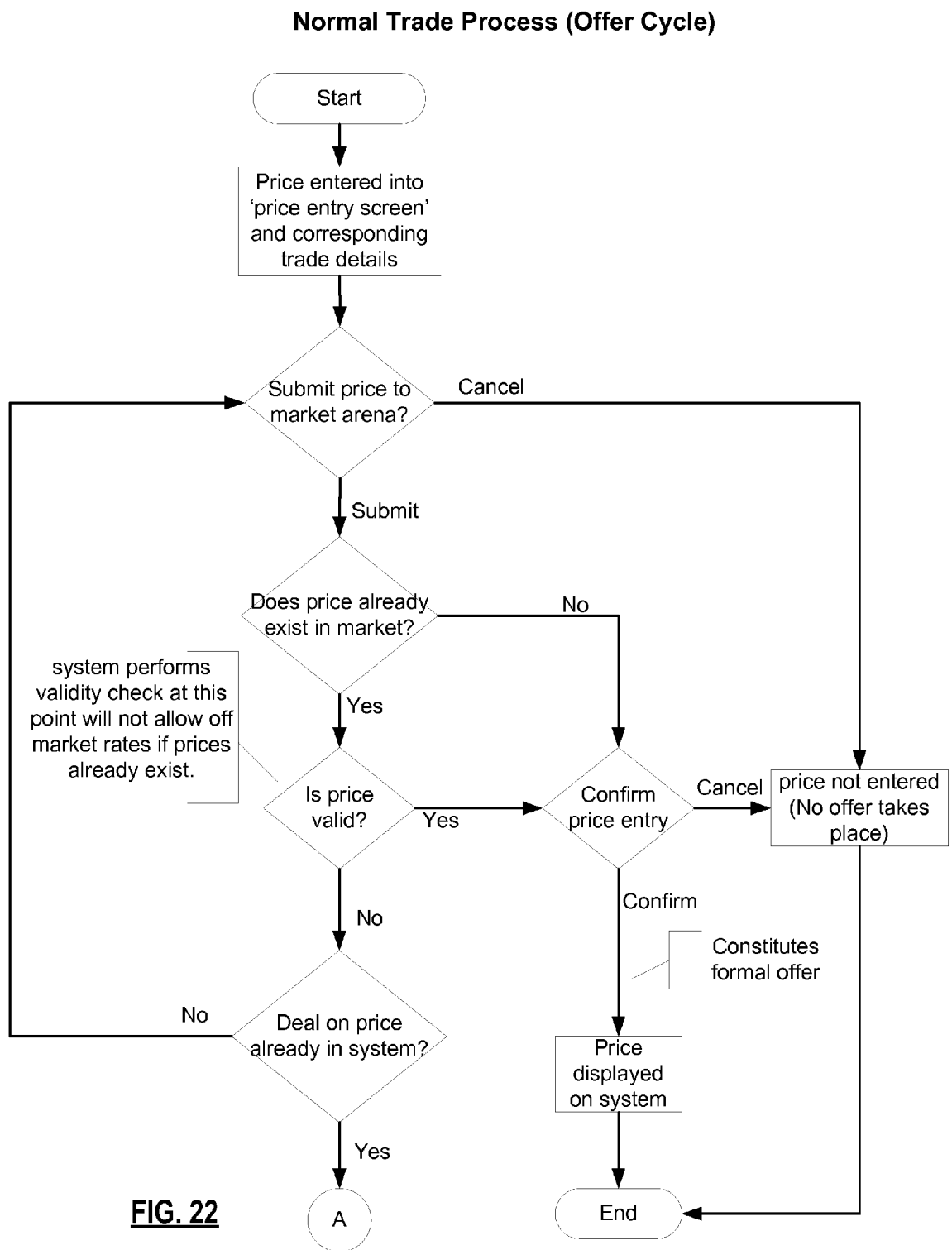
FIG. 22 shows a summary flow chart for the normal trade process (offer cycle).

A summary flowchart of the process for submitting a price to the system is shown in FIG. 22.

Figure 11:
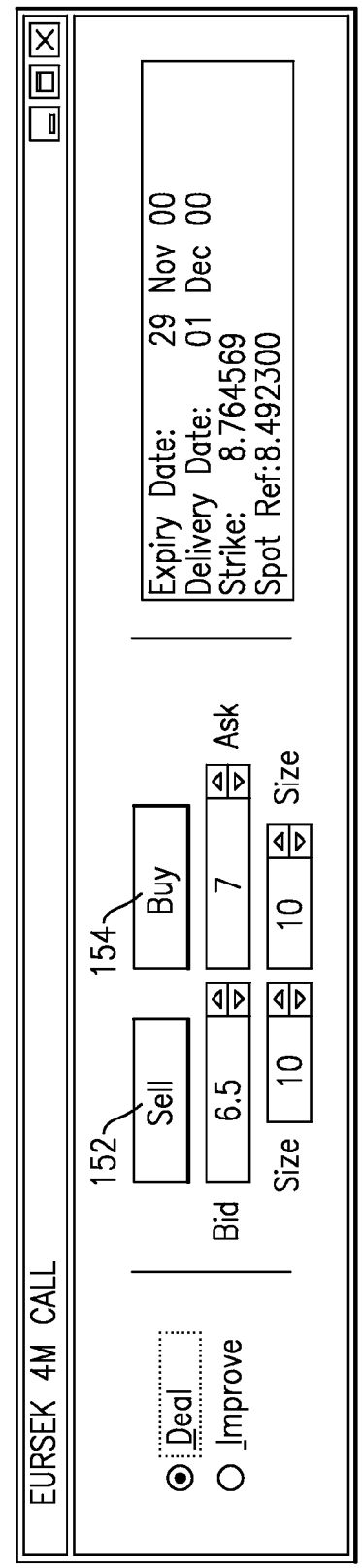
FIG. 11 shows a screen for dealing (selling or buying) specific tenors of on-the-run options at the bid or offer price.
Figure 12:
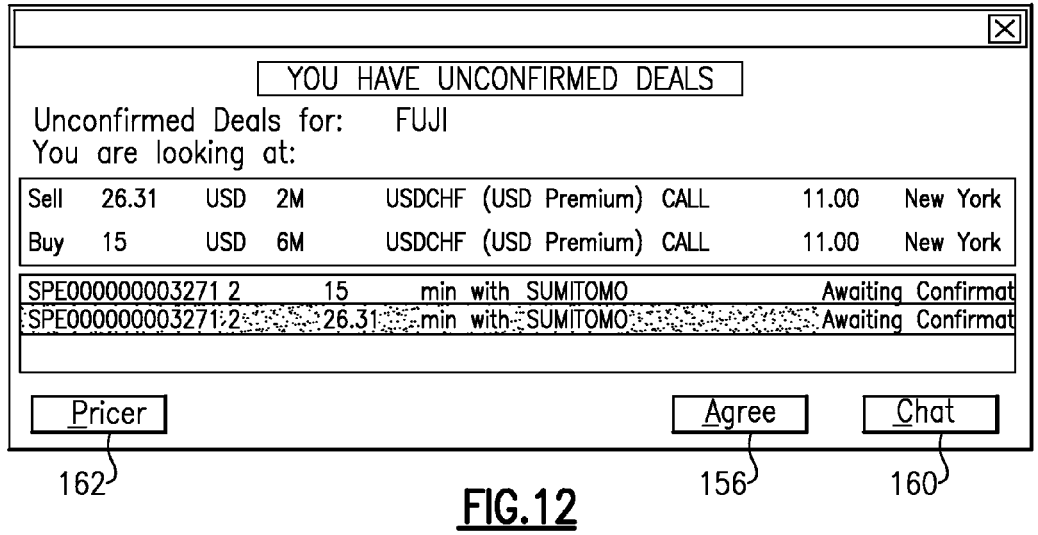
FIG. 12 shows a screen that identifies the counterparty to a trade and allows either party to display pricing details and to agree to the deal or to discuss details of the deal with the counterparty prior to agreement.

Dealing On Prices. A user can deal on a price by double-clicking on the bid 34 or the offer 36 on the screen of FIG. 1, and choosing to "deal" 148 rather than "improve" 150 on the screen of FIG. 6. When the user chooses to deal 148, the screen appears as shown in FIG. 11. This screen allows the user to sell at the quoted size and price or to buy at the quoted size and price. The system of the invention does not permit the user to deal on prices the user itself submitted. (The user is not likely to attempt to trade on these prices since they appear in a different color indicating to the user that it submitted the prices.) The user clicks on the "Sell" 152 button to accept the bid or on the "Buy" 154 button to accept the offer. Once the user clicks the Buy 154 or Sell 152 button, the system shows the user the names of the counterparty (or counterparties) with whom the user has dealt and the details of the trade, as shown in FIG. 12. The user can either "Agree" 156 to the deal or "Chat" 160 about the terms of the deal by clicking on the appropriate button in the bottom right hand corner of the screen shown in FIG. 12. Additionally, the user may click on the "Pricer" 162 button in the bottom left hand corner of the screen of FIG. 12 to obtain a display of contract details. This display is shown in the screen of FIG. 3. If no action is taken after 30 seconds, the deal is automatically confirmed. The time remaining for taking action 164 is shown in the upper right hand corner of the screen of FIG. 12.

If the user agrees with the details (which are the same details shown to the user before dealing) the user presses the "Agree" 156 button. Once the counterparty or counterparties have also agreed, the deal will be posted to the deal database. To prevent build-up of deal backlogs, the deal is completed automatically three minutes after the user has pressed the "Agree" 156 button with no response from the counterparty.

Figure 23:
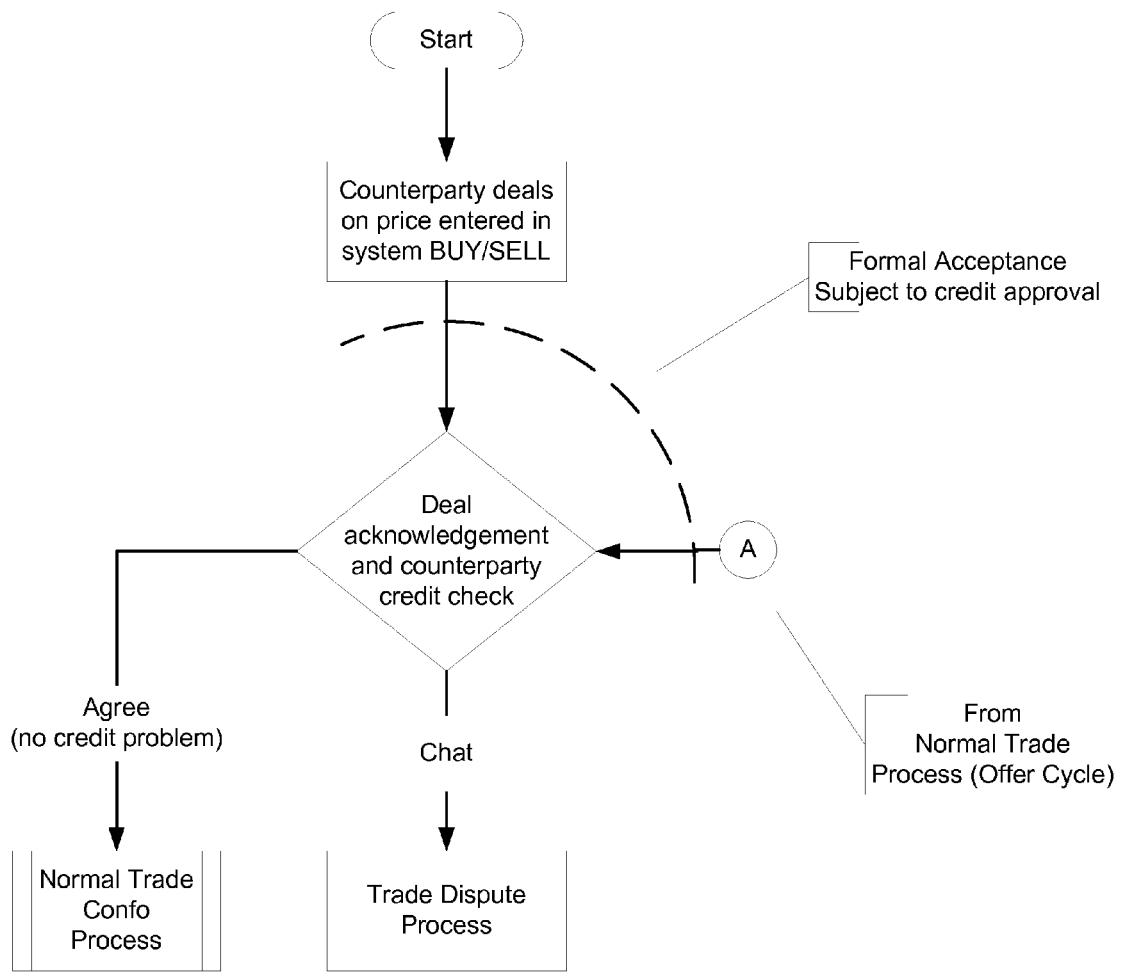
FIG. 23 shows a summary flow chart for the normal trade process (acceptance cycle).

A summary flowchart of the process for dealing on a price is shown in FIG. 23.

Figure 13:
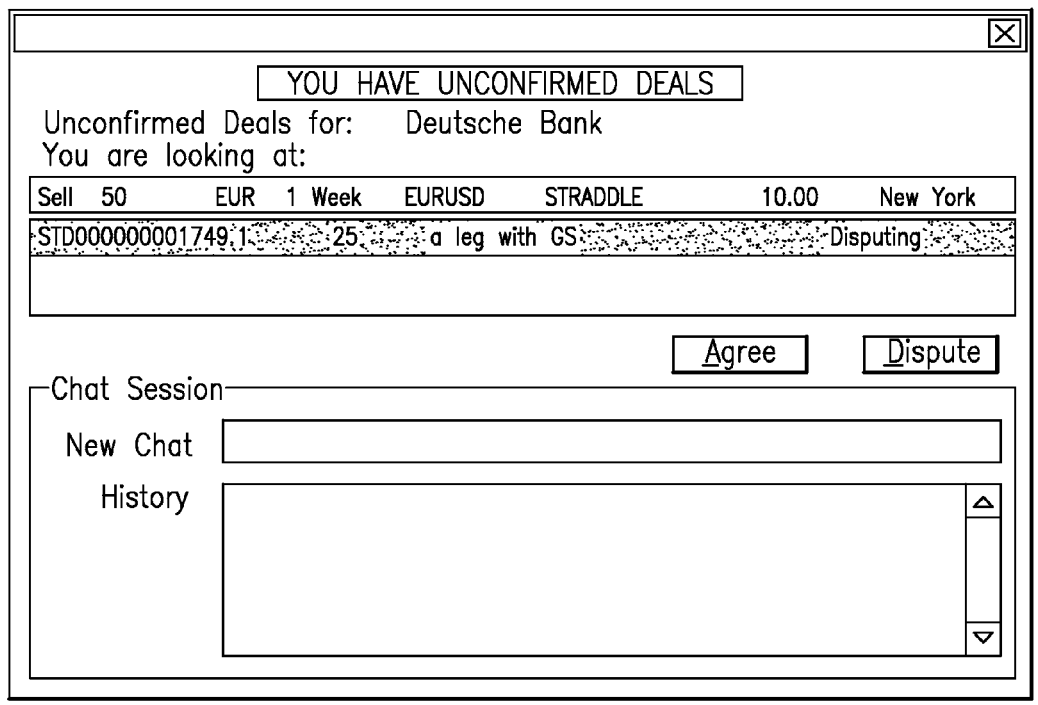
FIG. 13 shows a screen used to communicate with a counterparty after a request has been made to discuss the deal using an online "chat" facility.
Figure 24:
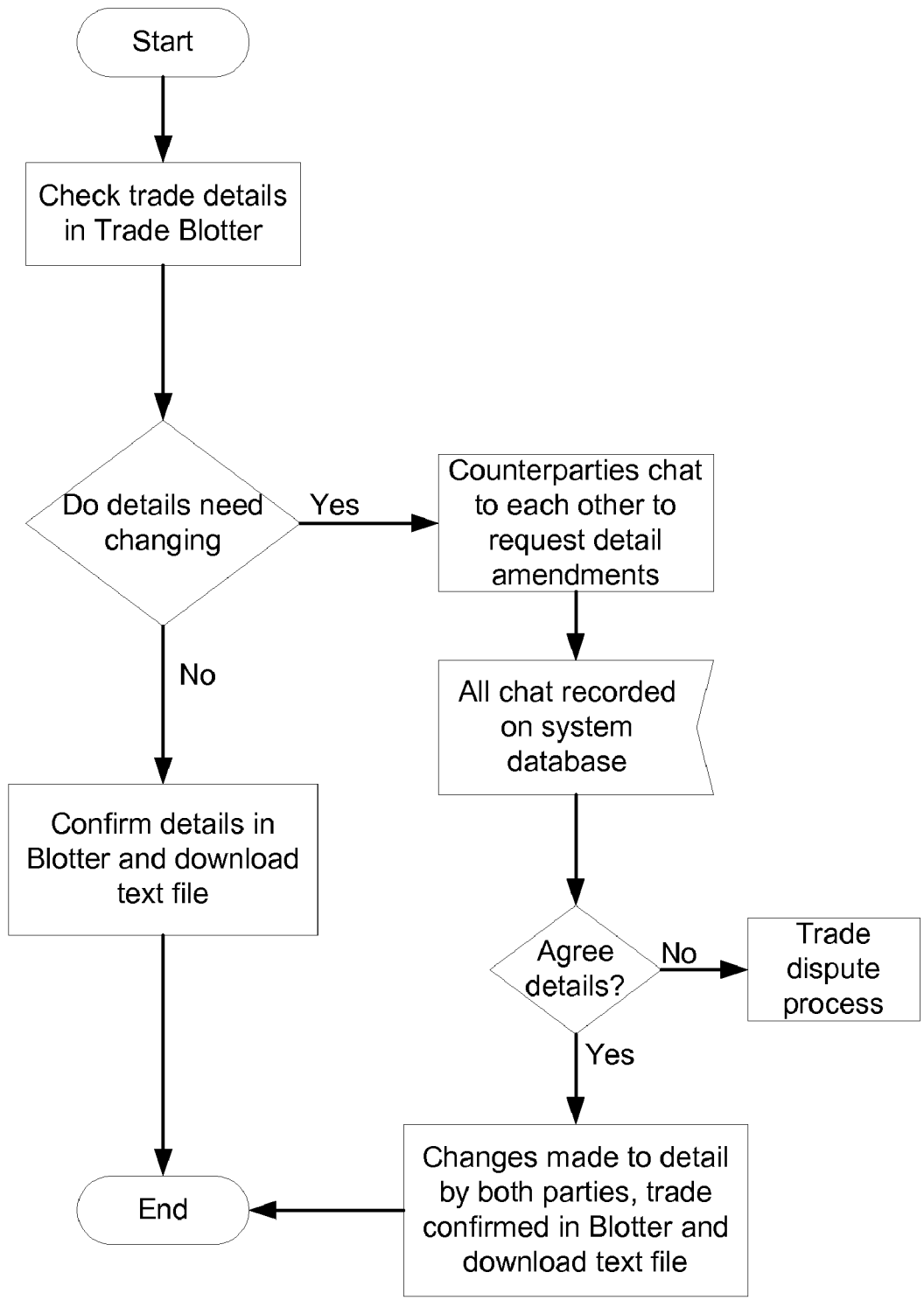
FIG. 24 shows a summary flow chart for the trade confirmation process.
Figure 25:
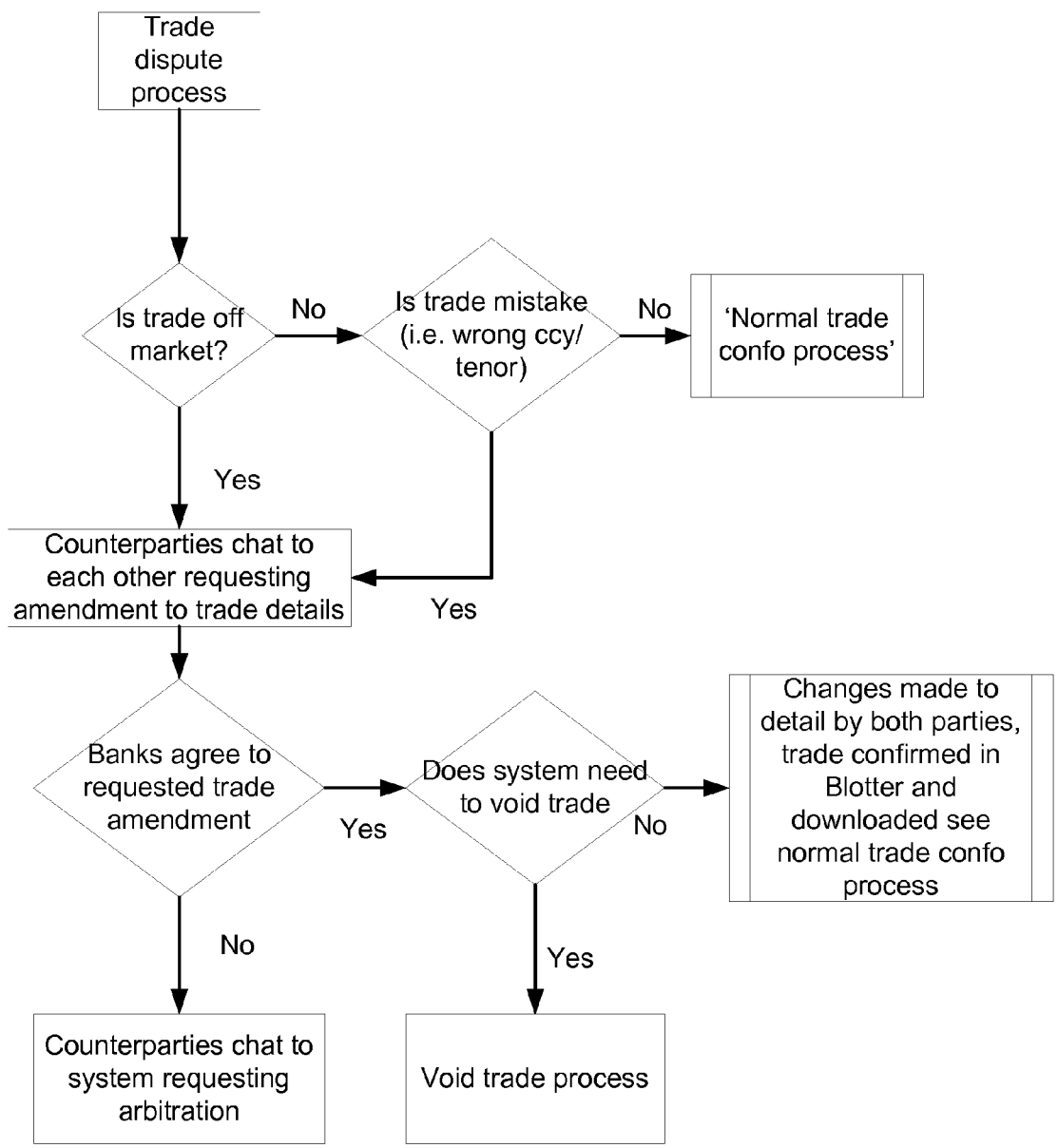
FIG. 25 shows a summary flow chart for the trade negotiation process.

If a counterparty disagrees with the deal details, the party can contact a member of the system's support team who will mediate between the two parties to reach an agreement. This is achieved using the system's online chat facility, a one-to-one Internet communication channel, or the phone. The online chat facility, which allows the user to hold an online conversation with the relevant counterparty, appears as shown in FIG. 13. A summary flowchart of this mediation process is shown in FIG. 24. A summary flowchart of the trade negotiation process is shown in FIG. 25.

Viewing Deals. Once deals are done, a user can see all of its deals in an on-line blotter, as shown in FIG. 14. The trade blotter screen of FIG. 14 offers extensive filter capabilities, as well as the ability to recalculate, confirm and reject changes to trades. Another embodiment of this screen is available to users who need to download details of confirmed trades, shown in FIG. 20.

The trade blotter screen of FIG. 14 can be downloaded electronically into the user's risk management system. A filter panel 166 is displayed on the right hand side of the screen. Information on the blotter may be filtered by the user so that the user may select to see totals of, for example, currency pair, maturity, strategy, buy or sell, counterparty or trader. FIG. 15 shows an example of the on-line blotter screen of FIG. 14 with totals by counterparty shown. Additionally, the user can sort records on values shown in the columns "Currency Pair" 168, "Trade Date" 170, "Strategy" 172, "Buy or Sell" 174, "Counterparty" and "Trader." The user can sort columns by selecting the desired sort options on the filter panel 166 of the screen of FIG. 14, or by clicking on the column header to sort by values in that column. Furthermore, the user can selectively filter records for one or more of the following categories: "Details unconfirmed," "Not Downloaded" or "All for the user's banks" by selecting these categories on the filter panel 166. The deal details may be downloaded to the user's own computer either manually by the user or automatically, with the user's computer polling the system of the invention to identify and download all new deals, with user-chosen frequency, or automatically with the system of the invention alerting the user's web or network server that deals are waiting. The user's web or network server can then request download of any deals. This blotter facility represents a substantial time and effort saving compared to the manual transfer of deal information that is currently in use by voice-brokers.

Figure 21:
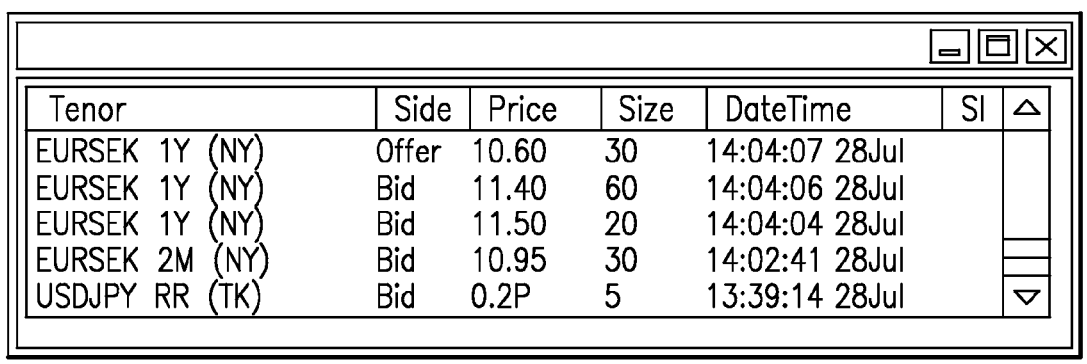
FIG. 21 shows a trade ticker screen which displays every trade which has been done in the system. As a trade is made, it is added to the top of this screen.

A trade ticker screen, shown in FIG. 21, is also available. This screen displays every trade that has been made on the system. As a trade is made, it is added to the top of this screen.

EXAMPLE 2

Most of the mechanics of dealing specific interests are very similar to those of dealing on-the-run options. However, some aspects of dealing are particular to specific-interests.

Requesting a Specific-Interest. FIG. 16 shows the second of the two main screens of the system of the invention. FIG. 16 is the main display screen for dealing specific-interest options. From this screen the user can enter an interest, which may be a standard strategy or a two-leg combination of strategies. There is no restriction on currency pairs for either strikes or delta trades. Thus, a currency spread, for example, would be specified as a straddle in one currency pair and a spread with a straddle in another currency pair.

The screen of FIG. 16 can be filtered to show options in one particular currency pair, options to which a user has contributed a price, or specific-interest options sought by the user. Each option has a series of fields that describe it and series of fields that show the price. The pricing fields have the same convention as the on-the-run options previously described in Example 1. A particular background color, for example yellow, on the pricing fields indicates that the specific interest shown was requested by the user.

A user requests a specific interest by clicking on the icon 180 on the specific interest screen. This displays the Post Specific-Interest Screen, shown in FIG. 17. The user inputs its request for a specific-interest on this screen. A specific-interest may be any standard strategy or a spread between two standard strategies. A standard strategy is one of the following: puts; calls; straddles; strangles (a combination of a put and a call in the same currency pair expiring on the same day, where the put and call have different strike prices); and risk reversals (a simultaneous sale and purchase of both a call and a put with the same expiration month and with different strike prices or with different expiration months and the same strike price). Thus, a currency spread, for example, could be specified as a straddle in one currency pair spread with a straddle in another currency pair. The screen of FIG. 17 also allows the user to input up to a two-leg combination interest.

The details of the specific-interest to be entered by the user include the currency pair 182, strategy 184 (put or call), strike 186, maturity 188, delivery date 190, amount 192 and cut-off convention 194. In the case of spreads, the user may specify an amount on one strategy and a vega-neutral amount on the other. Vega is a measure of the degree to which an option is sensitive to movements in the market level of volatility. When dealing on an option spread where one option is bought and one option is sold, then it is possible by defining a different amount of currency for the two options to avoid vega exposure to the spread taken as a whole. The vega from one option offsets the vega from the other. The system calculates the correct size for the second strategy to achieve vega-neutrality.

The screen of FIG. 17 displays several buttons at the bottom of the screen, including Post 196, Pricer 198 and Calc 200. The Pricer 198 button displays a screen providing details regarding the option contract (shown in FIG. 3) when selected. The Calc 200 button calculates the delta if a strike is entered and the strike if a delta is entered. The Post 196 button submits the specific-interest.

Market-Making Specific-Interests. Once the request for a specific-interest is submitted, the system provides the request to all first tier users. First tier users choose whether or not to make a market; however, a failure to do so would mean that the deal would not count towards the fulfillment of the user's market making obligations, if any.

The screen shown in FIG. 16 is used by the market makers to deal on specific-interests. If a market maker has supplied a volatility surface for the currency pair, the system suggests a rate based on that surface. In another embodiment, the system suggests a price based on a poll of first tier users. The system will show a price input screen (FIG. 6, the same input screen shown in the description of on-the-run options). Any price that is made for specific-interests may have spot-out and time-out limits applied in the same way as for on-the-run options.

Dealing on Specific-Interests. Once the first price is made, the Interest and the first tier market makers can see the price. At this point the Interest may choose to buy or sell or to improve one side of the price. The first tier market makers who did not provide the price may improve the price but cannot yet deal on it. Once the Interest has acted in any way (or once sufficient time passes if the Interest does nothing) the option is "cleared" and released to every user of the system to improve, or deal on, the price.

Improving and dealing on the price of specific-interests is handled in exactly the same way as for on-the-run options.

Figure 18:
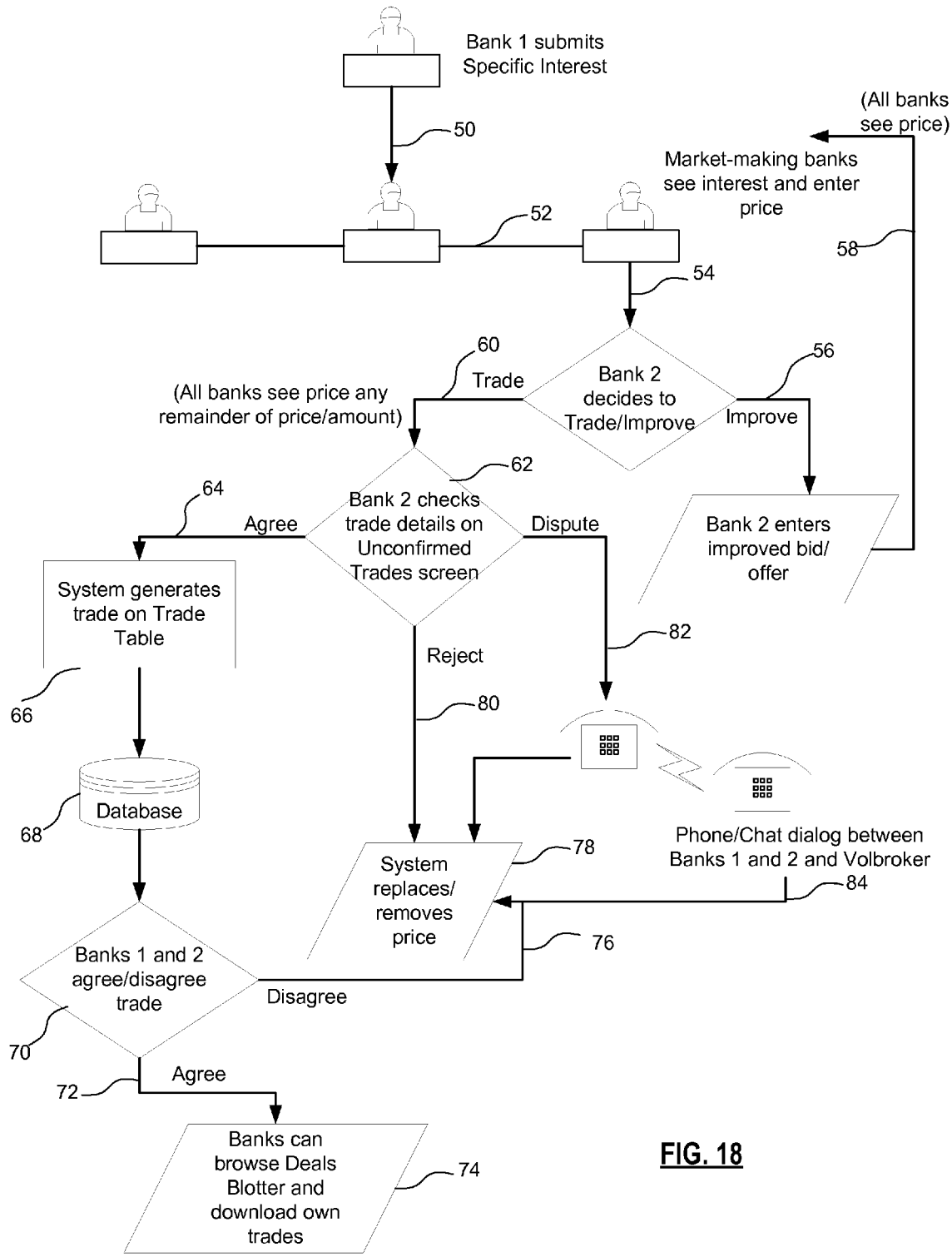
FIG. 18 shows a summary flow chart for trading specific-interests.

FIG. 18 shows a summary flow chart for trading specific interests. Bank 1 submits a specific-interest at step 50. Market-making banks see the specific-interest and enter prices at step 52. All banks see the prices entered. Bank 2 decides to either trade or improve on the price at step 54.

If Bank 2 decides to improve on the price, Bank 2 enters an improved bid and/or offer at step 56. All banks see the improved price step 58, and can choose to either trade or improve the price.

If Bank 2 decides to trade, all banks will see any remainder of price and amount that Bank 2 did not choose to trade at step 60. When Bank 2 selects trade, it may view details of the deal on the Unconfirmed Trade Screen at step 62. Upon viewing the Unconfirmed Trade Screen (shown in FIG. 12), Bank 2 may choose to Agree, Reject or Dispute the deal.

If Bank 2 selects Agree, the system of the invention generates a trade on the trade table at step 66. If the counterparties agree to deal with one another at step 70, the deal is confirmed and appears on their respective deal blotters at step 74. If the counterparties do not agree to the trade, the system of the invention replaces or removes the price at step 78.

If Bank 2 selects Reject on the Unconfirmed Trade Screen, the system of the invention removes or replaces the price at step 78.

Figure 26:
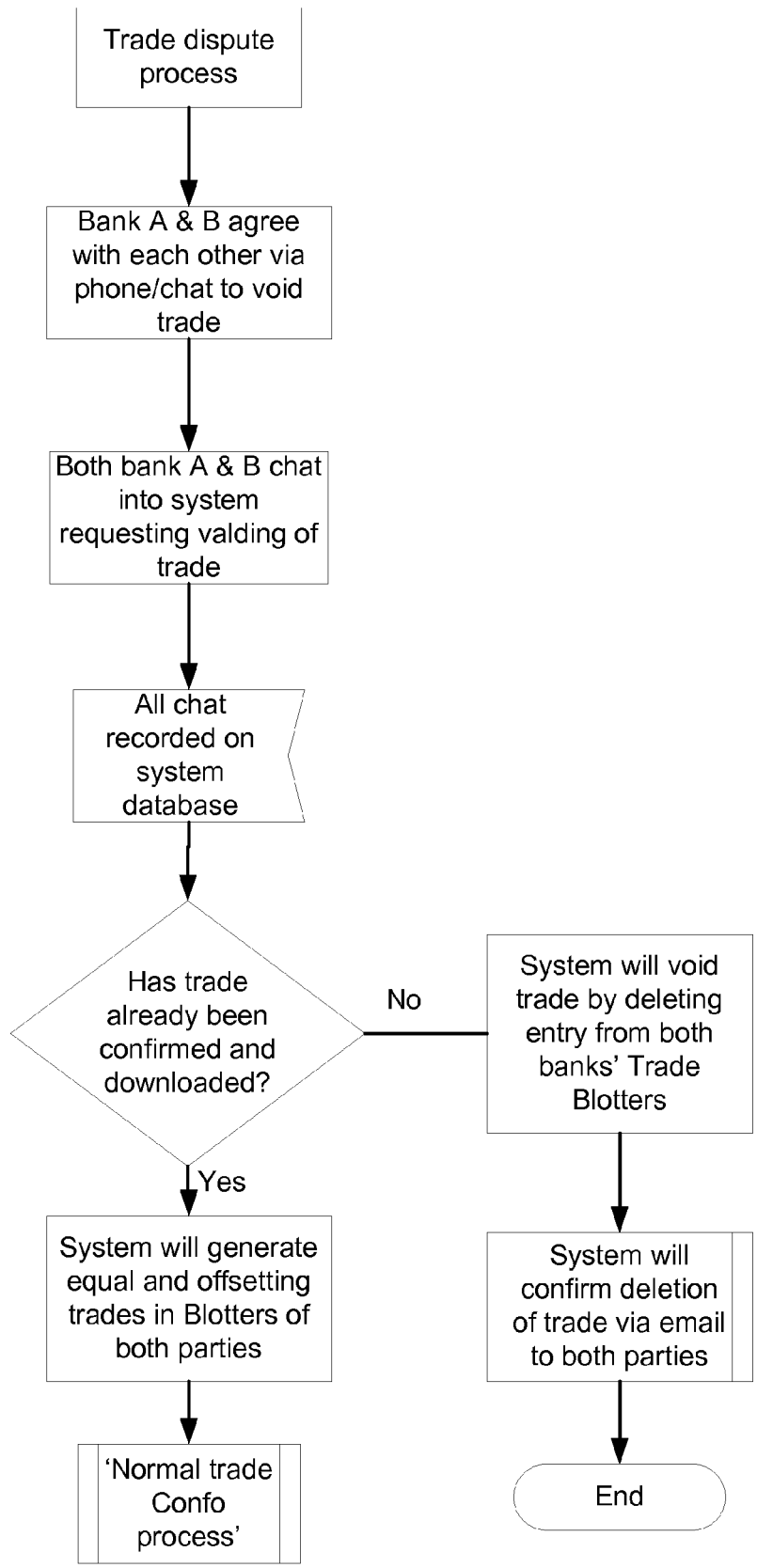
FIG. 26 shows a summary flow chart for the void trade process.

If Bank 2 selects Dispute on the Unconfirmed Trades Screen, the counterparties communicate directly with one another at step 84. If the counterparties agree to deal with one another, the deal is confirmed and posted to their respective deal blotters at step 84. If the counterparties choose not to deal with one another, the system of the invention replaces or removes the price at step 78. The void trade process is shown in the summary flowchart of FIG. 26.

Figure 19:
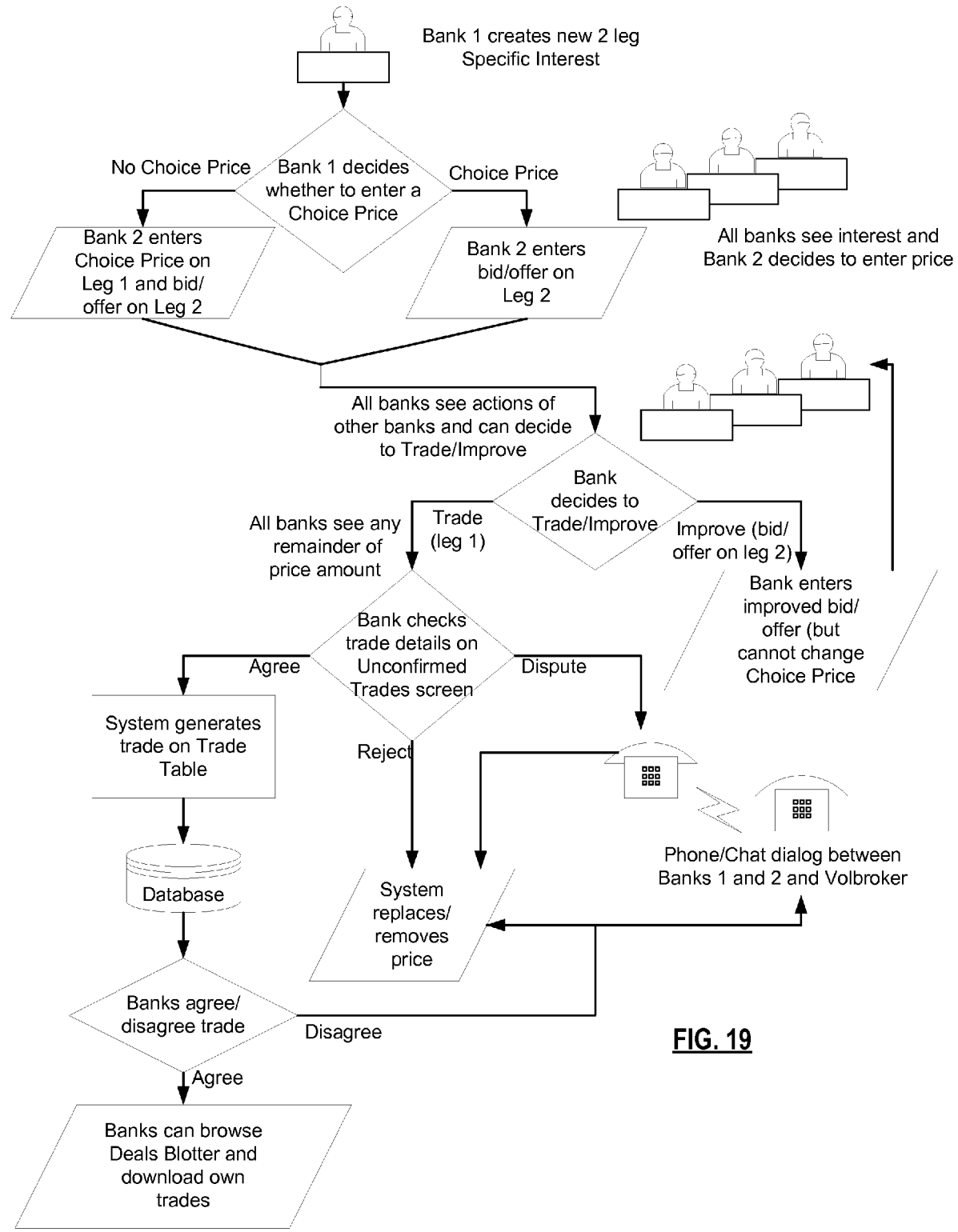
FIG. 19 shows a summary flow chart for trading 2-leg specific-interests.

FIG. 19 shows a summary flow chart for trading 2-leg specific-interests.

When a surface price taker requests autodealing, the system of the invention checks that the deal is below the size threshold for autodealing and then makes a composite price from the best bid and the best offer from the volatility surfaces that have been provided. The surface price taker will then be shown the price and may deal on it as previously described. The provision of a composite is simple in that the system takes the best bid and the best offer for any option that is requested. However, the system also includes checks to ensure that a submitted surface is not arbitrageable against any other surface that the system already holds. Deal details and deal booking are handled in the same way as for other options described.

We claim:

1. A computerized system for trading currency options, the system comprising:
   (a) a system server;
      (i) the system server operating a protocol for entering runs of offers to sell currency options and bids to buy currency options, entering offers to sell specific interest currency options and bids to buy specific interest currency options, dealing on offers to sell currency options or bids to buy currency options, and improving on offers to sell currency options or bids to buy currency options by a first tier of users; and
      (ii) the system server operating a protocol for entering runs of offers to sell currency options and bids to buy currency options, dealing on offers to sell currency options or bids to buy currency options, and improving on offers to sell currency options or bids to buy currency options by a second tier of users, the system server operating a protocol to preclude the second tier users from entering offers to sell specific interest currency options and bids to buy specific interest currency options;
      (iii) the system server operating a protocol for receiving a user's quote for an offer to sell or a bid to buy an option contract, the option contract for a currency pair having a current market price, the quote previously defined in a run, and receiving a period of time defined by the user corresponding to the quote, the system server operating a protocol to withdraw the quote if the corresponding period of time expires;
      (iv) the system server operating a protocol for receiving a user's quote for an offer to sell or a bid to buy an option contract, the option contract for a currency pair having a current market price, the quote previously defined in a run, and receiving a defined value for the currency pair provided by the user corresponding to the quote, the system server operating a protocol to compare the user's defined value for the currency pair to the current market price for the currency pair, and withdraw the user's quote if the user's defined value for the currency pair equals the current market price for the currency pair;
   (b) workstations for receiving offer and bid information on currency options from users, and for displaying offer and bid information on currency options to users; and
   (c) a communication link that receives and transmits communications between the users of the system and the system server, including communications to users that are parties to a completed currency option contract providing information concerning the completed contract,
      wherein a run is a dealer's set of prices to buy and sell tenors for options in a particular currency pair,
      wherein the option contract is a currency option contract, and
      wherein a currency pair is a pair of currencies which trade for cash settlement among professional dealers in an inter-bank market.

2. The computerized system of claim 1, wherein the currency options are for a currency pair, each of the currency pair selected from the group consisting of the following currencies: the Euro, the United States dollar, the Japanese yen, the British pound, the Swiss franc, the Australian dollar, the New Zealand dollar, the Canadian dollar, the Swedish krona, the Norwegian krone and the Greek drachma.

3. The computerized system of claim 1, wherein a user may specify a spot-out corresponding to an offer or a bid entered by the user.

4. The computerized system of claim 1, wherein a user may specify a time-out corresponding to an offer or a bid entered by the user.

5. The computerized system of claim 1, wherein the runs entered by the first tier users and the second tier users are volatility runs.

6. The computerized system of claim 5, wherein the first tier users and the second tier users are required to periodically submit volatility runs.

7. The computerized system of claim 1, wherein the option contracts are entered and displayed in units of volatility.

8. A computerized system for trading currency options, the system comprising:
   (a) a system server;
      (i) the system server operating a protocol for entering runs of offers to sell and bids to buy options, entering offers to sell specific interest currency options and bids to buy specific interest currency options, dealing on offers to sell currency options or bids to buy currency options and improving on outstanding offers to sell currency options or bids to buy currency options by a first tier of users;
      (ii) the system server operating a protocol for entering runs of offers to sell currency options and bids to buy currency options, dealing on offers to sell currency options or bids to buy currency options and improving on offers to sell currency options or bids to buy currency options by a second tier of users, the system server operating a protocol to preclude second tier users from entering offers to sell specific interest currency options and bids to buy specific interest currency options; and
      (iii) the system server operating a protocol for dealing on offers to sell or bids to buy options by a third tier of users, the system server operating a protocol to preclude third tier users from entering runs of offers to sell currency options and bids to buy currency options, entering offers to sell specific interest currency options and bids to buy specific interest currency options and improving on offers to sell or bids to buy options; and (iv) the system server operating a protocol for receiving a user's quote for an offer to sell or a bid to buy an option contract, the option contract for a currency pair having a current market price, the quote previously defined in a run, and receiving a period of time defined by the user corresponding to the quote, the system server operating a protocol to withdraw the quote if the corresponding period of time expires; and (v) the system server operating a protocol for receiving a user's quote for an offer to sell or a bid to buy an option contract, the option contract for a currency pair having a current market price, the quote previously defined in a run, and receiving a defined value for the currency pair provided by the user corresponding to the quote, the system server operating a protocol to compare the user's defined value for the currency pair to the current market price for the currency pair, and withdraw the user's quote if the user's defined value for the currency pair equals the current market price for the currency pair; and (b) workstations for receiving offer and bid information on currency options from users and for displaying offer and bids information on currency options to users; and (c) a communication link that receives and transmits communications between the users of the system and the system server, including communications to users that are parties to a completed system transaction providing information concerning the completed transaction,
wherein a run is a dealer's set of prices to buy and sell tenors for options in a particular currency pair,
wherein the option contract is a currency option contract, and
wherein a currency pair is a pair of currencies which trade for cash settlement among professional dealers in an inter-bank market.

9. The computerized system of claim 8, wherein the system server operates a protocol permitting a user to provide credit criteria via the communication link specifying counterparties with which the user will deal, the protocol operating such that the user may access only offers to sell and bids to buy from the counterparties that meet the credit criteria.

10. The computerized system of claim 9, wherein the credit criteria provided comprises a maximum deal amount.

11. The computerized system of claim 8, wherein the runs entered by the first tier users and the second tier users are volatility runs.

12. The computerized system of claim 8, wherein the options traded on the system have a tenor of one week to one year.

13. The computerized system of claim 8, wherein the options traded have a tenor selected from a group of tenors consisting of: one week, one month, two months, three months, six months, nine months and one year.

14. The computerized system of claim 8, wherein the currency options are for a currency pair, each of the currency pair is selected from the group consisting of the following currencies: the Euro, the United States dollar, the Japanese yen, the British pound, the Swiss franc, the Australian dollar, the New Zealand dollar, the Canadian dollar, the Swedish krona, the Norwegian krone and the Greek drachma.

15. The computerized system of claim 8, wherein the option contracts are entered and displayed in units of volatility.

16. The computerized system of claim 15, wherein the first tier users and the second tier users can access a display of a volatility run.

17. The computerized system of claim 16, wherein the display of the volatility run comprises a current market rate for each of the options in the volatility run until a volatility run is entered by a user.

18. The computerized system of claim 17, wherein the first tier users are required to periodically submit volatility runs.

19. The computerized system of claim 15, wherein the information transmitted to the parties of the completed system currency option contract includes a conversion of the cost of the contract from units of volatility into a monetary price.

20. A method for trading of currency option contracts on a computer system comprising:

(a) providing by a computer system to a plurality of users offers to sell and bids to buy options, wherein the plurality of users comprises a first tier of users, a second tier of users, and a third tier of users;

(b) receiving by the computer system from the first tier of users (i) a set of runs of offers to sell and bids to buy options and (ii) a first set of commands to deal on offers to sell or bids to buy options and (iii) a first set of improvements to offers to sell or bids to buy options;

(c) receiving by the computer system from the second tier of users (i) a second set of commands to deal on offers to sell or bids to buy options and (ii) a second set of improvements to offers to sell or bids to buy options;

(d) receiving by the computer system from the third tier of users a third set of commands to deal on offers to sell or bids to buy options;

(e) receiving by the computer system a user's quote for an offer to sell or a bid to buy an option contract, the option contract for a currency pair having a current market price, the quote previously defined in a run,
wherein the option contract is a currency option contract,
wherein a currency pair is a pair of currencies which trade for cash settlement among professional dealers in an inter-bank market;

(f) receiving by the computer system a period of time defined by the user corresponding to the quote;

(g) withdrawing by the computer system the quote if the corresponding period of time expires;

(h) receiving by the computer system a defined value for the currency pair provided by the user corresponding to the quote;

(i) comparing by the computer system the user's defined value for the currency pair to the current market price for the currency pair;

(j) withdrawing by the computer system the user's quote if the user's defined value for the currency pair equals the current market price for the currency pair;

(k) engaging by the computer system in a sell or buy transaction in accordance with the first, second, or third commands to deal on offers to sell or bids to buy options; and (l) transmitting by the computer system information concerning a transaction to all users party to the transaction,
wherein a run is a dealer's set of prices to buy and sell tenors for options in a particular currency pair.

21. The method of claim 20, wherein the method further comprises receiving credit criteria from the users whereby each user specifies the other users with which the user will deal; and transmitting offers to sell and bids to buy option contracts provided by the other users that meet the criteria specified by the user.

22. The method of claim 20, wherein the information transmitted concerning a completed transaction includes names of the parties to the completed transaction, tenor, volume of currency, price and date and time that the transaction was completed.

23. The method of claim 22, wherein the price is provided in units of volatility.

24. The method of claim 22, wherein the information concerning a completed transaction includes a price in volatility units and monetary units.

25. The method of claim 20, wherein the runs received from the first tier users are volatility runs, wherein a volatility run is a set of prices expressed in terms of volatility for a standard tenor for a particular currency pair at a particular strike price.

26. The method of claim 25, wherein the volatility runs are received periodically from each of the first tier users.

* * * * *